US011025911B2

(12) United States Patent
Azukizawa

(10) Patent No.: US 11,025,911 B2
(45) Date of Patent: Jun. 1, 2021

(54) ENCODING METHOD, DECODING METHOD, ENCODING DEVICE, AND DECODING DEVICE

(71) Applicant: Socionext Inc., Kanagawa (JP)

(72) Inventor: Yoichi Azukizawa, Kanagawa (JP)

(73) Assignee: Socionext Inc., Yokohama (JP)

( * ) Notice: Subject to any disclaimer, the term of this patent is extended or adjusted under 35 U.S.C. 154(b) by 0 days.

(21) Appl. No.: 16/890,292

(22) Filed: Jun. 2, 2020

(65) Prior Publication Data

US 2020/0296371 A1    Sep. 17, 2020

Related U.S. Application Data

(63) Continuation of application No. PCT/JP2017/043603, filed on Dec. 5, 2017.

(51) Int. Cl.
*H04N 19/122* (2014.01)
*H04N 19/167* (2014.01)
(Continued)

(52) U.S. Cl.
CPC ......... *H04N 19/122* (2014.11); *H04N 19/167* (2014.11); *H04N 19/176* (2014.11); *H04N 19/625* (2014.11)

(58) Field of Classification Search
CPC .. H04N 19/122; H04N 19/167; H04N 19/176; H04N 19/625; H04N 19/159; H04N 19/12
See application file for complete search history.

(56) References Cited

U.S. PATENT DOCUMENTS

| 2013/0003838 | A1  | 1/2013 | Gao et al. |
| 2017/0280162 | A1* | 9/2017 | Zhao ................. H04N 19/61 |
| 2020/0177921 | A1* | 6/2020 | Koo .................. H04N 19/176 |

FOREIGN PATENT DOCUMENTS

| JP | 2014-036278 | 2/2014 |
| JP | 2014-045434 | 3/2014 |
| JP | 2014-520493 | 8/2014 |

OTHER PUBLICATIONS

International Search Report dated Feb. 20, 2018 with respect to No. PCT/JP2017/043603.

(Continued)

*Primary Examiner* — Tat C Chio
(74) *Attorney, Agent, or Firm* — IPUSA, PLLC

(57) ABSTRACT

An encoding method for encoding an image using an inter-picture prediction includes determining a prediction block on which the inter-picture prediction is to be performed, partitioning the prediction block into a plurality of transform blocks by a partitioning method that partitions the prediction block, so that boundaries of the plurality of transform blocks are symmetrical with respect to a horizontal line passing a center of the prediction block and are symmetrical with respect to a vertical line passing the center of the prediction block, the plurality of transform blocks being rectangular, and determining, for each of the plurality of transform blocks, an orthogonal transformation type used for each of a vertical direction and a horizontal direction of a given transform block of the plurality of transform blocks based on a positional relation between the given transform block and the center of the prediction block.

27 Claims, 16 Drawing Sheets

(51) Int. Cl.
*H04N 19/176* (2014.01)
*H04N 19/625* (2014.01)

(56) References Cited

OTHER PUBLICATIONS

Written Opinion of the International Searching Authority dated Feb. 20, 2018 with respect to No. PCT/JP2017/043603, with English translation of the relevant part.
Jicheng An et al., Non-CE7: Boundary-Dependent Transform for Inter-Predicted Residue, Joint Collaborative Team on Video Coding (JCT-VC) of ITU-T SG 16 WP 3 and ISO/IEC JTC1/SC29/WG 117th Meeting: Geneva, CH., Nov. 21-30, 2011, JCTVC-G281, Nov. 30, 2011, Cited in ISR for No. PCT/JP2017/043603.
Jianle Chen et al., Algorithm Description of Joint Exploration Test Model 7 (JEM 7), Joint Video Exploration Team (JVET)of ITU-T SG 16 WP 3 and ISO/IEC JTC 1/SC 29/WG 117th Meeting: Torino, IT, Jul. 13-21, 2017, JVET-G1001-v1, Aug. 19, 2017, Cited in ISR for No. PCT/JP2017/043603.
Tammy Lee et al., TE 12.1: Transform unit quadtree/2-level test, Joint Collaborative Team on Video Coding (JCT-VC) of ITU-T SG16 WP3 and ISO/IEC JTC1/SC29/WG11 WG11 No. m182383rd Meeting: Guangzhou, CN, Oct. 7-15, 2010, JCTVC-C200, Oct. 15, 2010, Cited in ISR for No. PCT/JP2017/043603.
Series H: Audiovisual and Multimedia Systems Infrastructure of audiovisual services—Coding of moving video, High efficiency video coding, ITU-T H.265 (Dec. 2016).
G. J. Sullivan et al. "Overview of the High Efficiency Video Coding (HEVC) Standard" IEEE Transactions on Circuits and Systems for Video Technology, vol. 22, No. 12, Dec. 2012 pp. 1649-pp. 1668.
Jianle Chen et al., Algorithm Description of Joint Exploration Test Model 6 (JEM 6), Joint Video Exploration Team (JVET)of ITU-T SG 16 WP 3 and ISO/IEC JTC 1/SC 29/WG 116th Meeting: Hobart, AU, Mar. 31-Apr. 7, 2017, JVET-F1001-v3.

\* cited by examiner

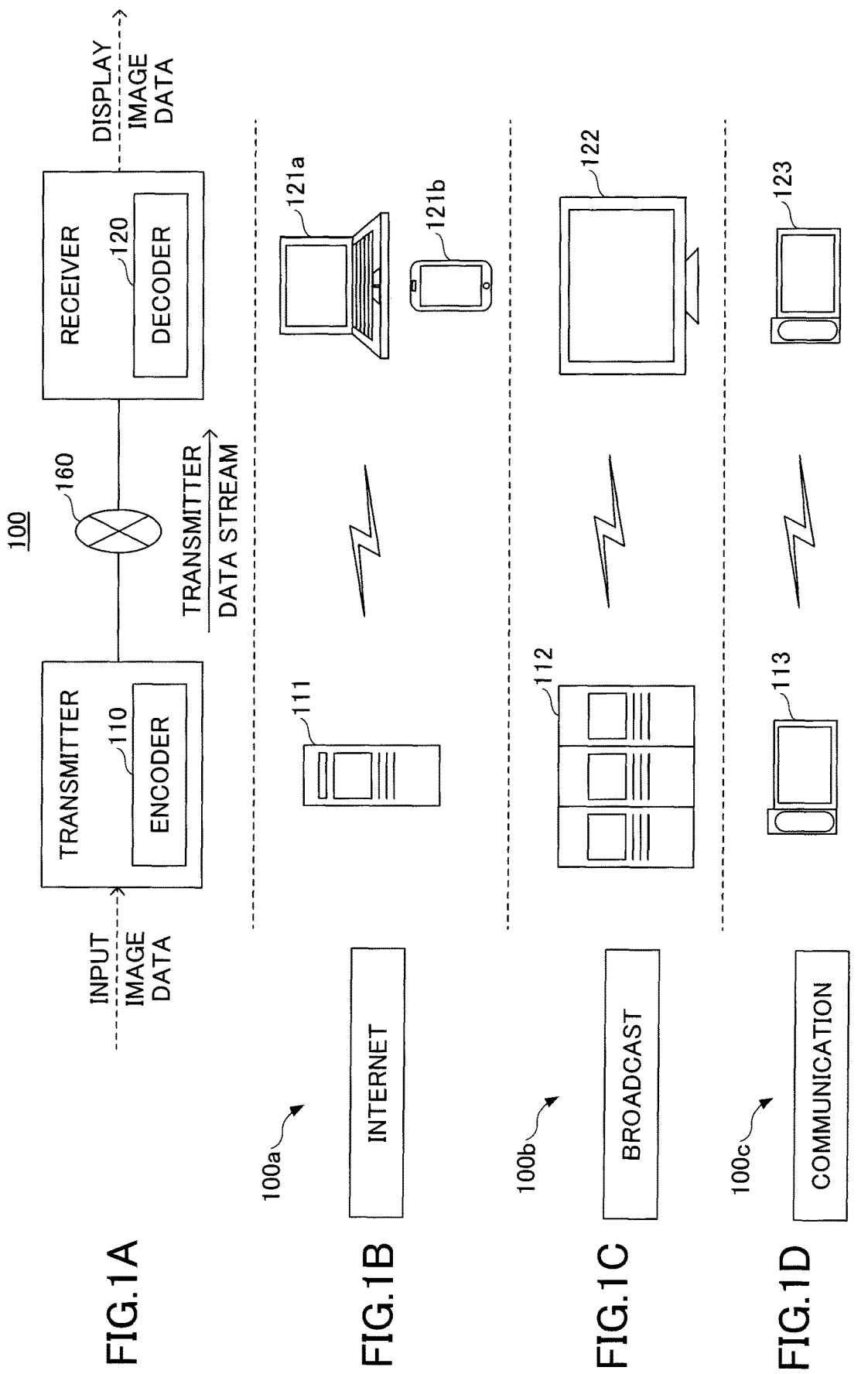

FIG.6A

| ORTHOGONAL TRANSFORMATION TYPE | TWO-DIMENSIONAL BASIS FORMULA | CHARACTERISTIC |
|---|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i = 0 \\ 1 & i \neq 0 \end{cases}$ | ·BASIS THAT IS SUITABLE WHEN PREDICTION RESIDUAL SIGNAL IS FLAT AND CORRELATION BETWEEN SIGNALS IS HIGH |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ | ·BASIS THAT IS SUITABLE FOR UNBALANCED FEATURE SUCH THAT PREDICTION RESIDUAL SIGNAL IS LARGE NEAR BLOCK BOUNDARY AND PREDICTION RESIDUAL SIGNAL BECOMES SMALLER WITH INCREASING DISTANCE FROM BLOCK BOUNDARY |
| DST-VII | $T_i(j) = \sqrt{\dfrac{4}{2N+1}} \cdot \sin\left(\dfrac{\pi \cdot (2i+1) \cdot (j+1)}{2N+1}\right)$ | ·BASIS THAT IS SUITABLE FOR UNBALANCED FEATURE SUCH THAT PREDICTION RESIDUAL SIGNAL IS SMALL NEAR BLOCK BOUNDARY AND PREDICTION RESIDUAL SIGNAL BECOMES LARGER WITH INCREASING DISTANCE FROM BLOCK BOUNDARY |

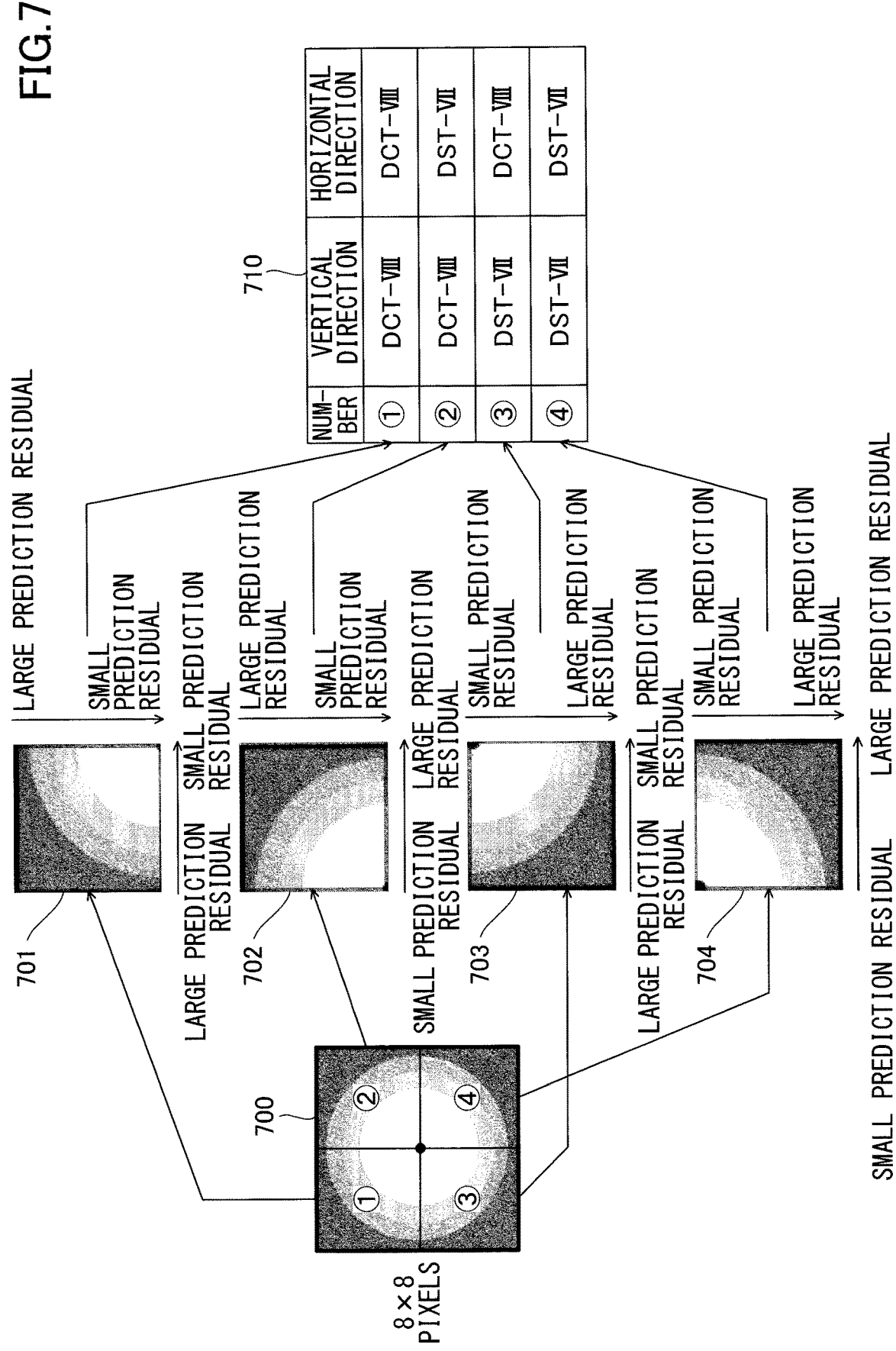

8 × 16
PIXELS

16 × 8
PIXELS

16 × 32
PIXELS
or
32 × 64
PIXELS
or
64 × 128
PIXELS

32 × 16
PIXELS
or
64 × 32
PIXELS
or
128 × 64
PIXELS

ENCODING METHOD, DECODING METHOD, ENCODING DEVICE, AND DECODING DEVICE

CROSS-REFERENCE TO RELATED APPLICATIONS

This application is a continuation application of International Application No. PCT/JP2017/043603 filed on Dec. 5, 2017, and designated the U.S., the entire contents of which are incorporated herein by reference.

FIELD

The disclosure herein relates to an encoding method, a decoding method, an encoding device, a decoding device, a non-transitory computer-readable storage medium for storing an encoding program, and a non-transitory computer-readable storage medium for storing a decoding program.

BACKGROUND

In a standardized video codec (e.g., H.265/HEVC, etc.), an orthogonal transformation process is performed on a prediction residual signal calculated from a difference between an input image and a prediction image (i.e., a prediction image generated by an intra-picture prediction or a prediction image generated by an inter-picture prediction) when the input image is encoded.

When the orthogonal transformation process is performed on the prediction residual signal, encoding efficiency varies depending on which type of an orthogonal transformation is used. Therefore, it is desired do determine an orthogonal transformation type in accordance with a characteristic of the prediction residual signal.

For example, Patent Document 1 below proposes a method to narrow an orthogonal transformation type based on a positional relation between a prediction block used for the inter-picture prediction and a transform block used for the orthogonal transformation, when an input image is encoded using the inter-picture prediction. According to the method, the orthogonal transformation can be selected in accordance with a characteristic of the prediction residual signal determined by the positional relation.

RELATED-ART DOCUMENTS

Patent Documents

Patent Document 1: Japanese Laid-Open Patent Publication No. 2014-36278

SUMMARY

According to an embodiment of the present invention, an encoding method for encoding an image using an inter-picture prediction includes determining a prediction block on which the inter-picture prediction is to be performed, partitioning the prediction block into a plurality of transform blocks by a partitioning method that partitions the prediction block, so that boundaries of the plurality of transform blocks are symmetrical with respect to a horizontal line passing a center of the prediction block and are symmetrical with respect to a vertical line passing the center of the prediction block, the plurality of transform blocks being rectangular, and determining, for each of the plurality of transform blocks, an orthogonal transformation type used for each of a vertical direction and a horizontal direction of a given transform block of the plurality of transform blocks based on a positional relation between the given transform block and the center of the prediction block.

BRIEF DESCRIPTION OF THE DRAWINGS

FIGS. 1A, 1B, 1C, and 1D are drawings illustrating application examples of an encoder and a decoder;

FIG. 6A is a drawing illustrating a type and a characteristic of orthogonal transformation;

FIG. 7 is a first drawing illustrating a characteristic of a prediction residual signal in each transform block and an orthogonal transformation type assigned to each transform block;

DESCRIPTION OF THE EMBODIMENTS

Figure 2A:
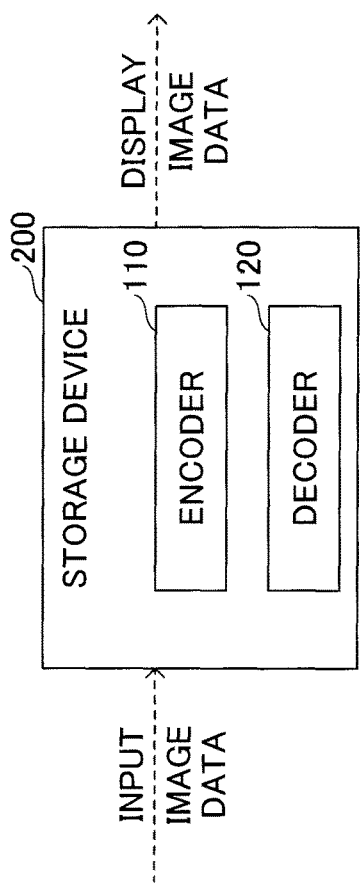
FIGS. 2A and 2B are drawings illustrating other application examples of the encoder and the decoder.

In the next generation codec following H.265/HEVC, it is expected that block partitioning is not performed at the orthogonal transformation. Therefore, in the next generation codec, a determination of an orthogonal transformation type based on the positional relation between the prediction block and the transform block, as in Patent Document 1 described above, cannot be performed (if the positional relation is intentionally used, only one positional relation can be always used).

Additionally, in Patent Document 1 described above, an encoding cost (e.g., a rate distortion (RD) value) is calculated for each narrowed orthogonal transformation type, and the RD values are compared to determine one orthogonal transformation. Therefore, in Patent Document 1 described above, there is a problem that a calculation load on an encoder is high when the input image is encoded using the inter prediction.

In the following, embodiments will be described with reference to the accompanying drawings. In the specification and the drawings, constituent elements having substantially the same functional configurations may be given the same reference numerals, and redundant descriptions are omitted.

First Embodiment

<1. Application Example of an Encoder and a Decoder>

First, an application example of an encoder (i.e., an encoding device) and a decoder (i.e., a decoding device) will be described. FIGS. 1A, 1B, 1C, and 1D are drawings illustrating application examples of an encoder and a decoder.

As illustrated in FIG. 1A, an encoder 110 may be disposed in a transmitter, a decoder 120 may be disposed in a receiver, and the encoder 110 and the decoder 120 may be connected through a network 160 to form an image processing system 100 to which the encoder 110 and the decoder 120 are applied.

In the image processing system 100, the encoder 110 disposed in the transmitter generates a data stream (i.e., an encoding sequence) by encoding input image data. The transmitter transmits the generated data stream to the receiver through the network 160.

The receiver receives the data stream. The decoder 120 disposed in the receiver generates image data by decoding the data stream and displays the image data.

By forming such an image processing system 100, the encoder 110 and the decoder 120 can be applied to various fields, such as a field of the Internet, a broadcast field, a communication field, and the like.

In FIG. 1B, an application example 100a indicates an example in which the image processing system 100 is applied to the field of the Internet. In the application example 100a, a data stream transmitted from a server 111, which is an example of the transmitter, is received and displayed by a personal computer 121a, a smart terminal 121b, or the like, which is an example of the receiver. This enables a user of the personal computer 121a or the smart terminal 121b to view moving image data stored in the server 111 through the Internet.

In FIG. 1C, an application example 100b indicates an example in which the image processing system 100 is applied to the broadcast field. In the application example 100b, a television 122, which is an example of the receiver, receives and displays a data stream transmitted from a broadcast transmitter 112, which is an example of the transmitter. This enables, for example, a user of the television 122 to watch broadcast contents transmitted by the broadcast transmitter 112.

In FIG. 1D, an application example 100c indicates an example in which the image processing system 100 is applied to the communication field. In the application example 100c, a video phone 123, which is an example of the receiver, receives and displays a data stream transmitted from a video phone 113, which is an example of the transmitter. This enables a user of the video phone 123 to talk with looking at a conversation partner's face.

Figure 2B:
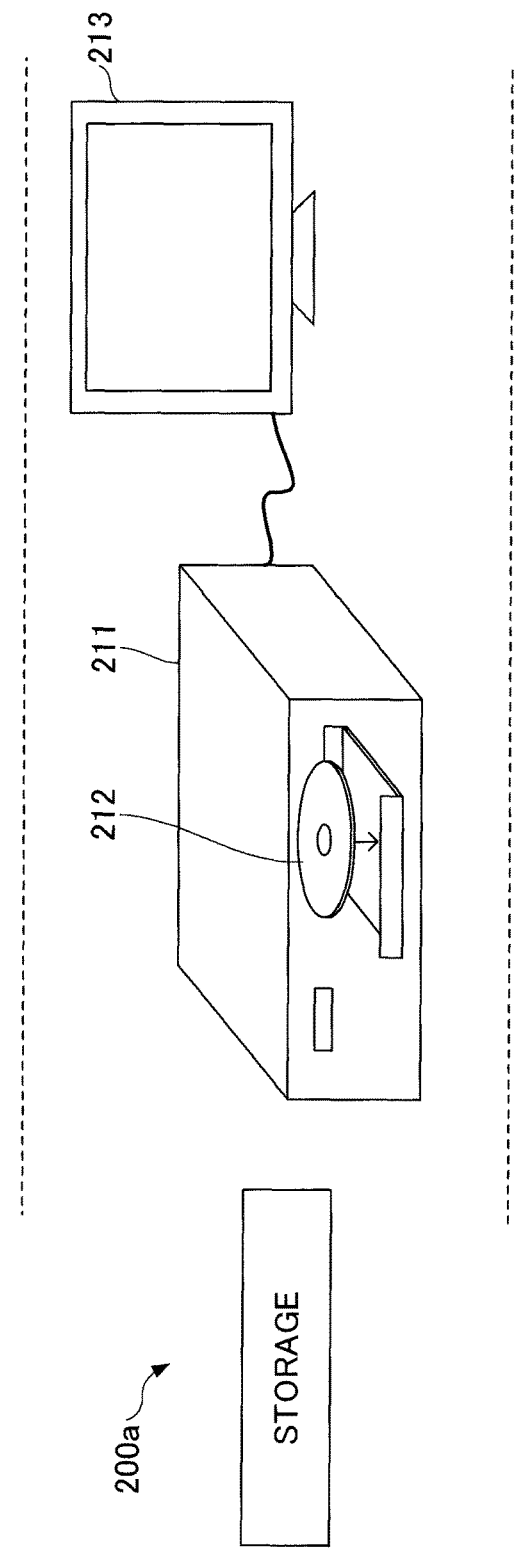

FIGS. 2A and 2B are drawings illustrating other application examples of the encoder and the decoder. As illustrated in FIG. 2A, the encoder 110 and the decoder 120 can be integrally configured to form a storage device 200 to which the encoder 110 and the decoder 120 are applied.

The storage device 200 encodes input image data using the encoder 110 and stores generated data stream in a recording medium. The storage device 200 generates and displays image data by decoding the data stream stored in the recording medium using the decoder 120.

With forming such a storage device 200, the encoder 110 and the decoder 120 can be applied to a storage field, for example. An application example 200a indicates an example in which the storage device 200 is applied to the storage field. In the application example 200a illustrated in FIG. 2B, a video recorder 211, which is an example of the storage device 200, stores data stream generated by encoding image data using the encoder 110 that is incorporated, in the recording medium 212. The video recorder 211 displays image data generated by decoding the data stream read from the recording medium 212 using the decoder 120 that is incorporated, on the monitor 213. This enables a user of the video recorder 211 to efficiently store obtained moving image data.

<2. Hardware Configuration of the Encoder and the Decoder>

Next, a hardware configuration of the encoder and the decoder will be described. As the encoder 110 and the decoder 120 have a similar hardware configuration, the hardware configuration of the encoder 110 will be described here.

Figure 3:
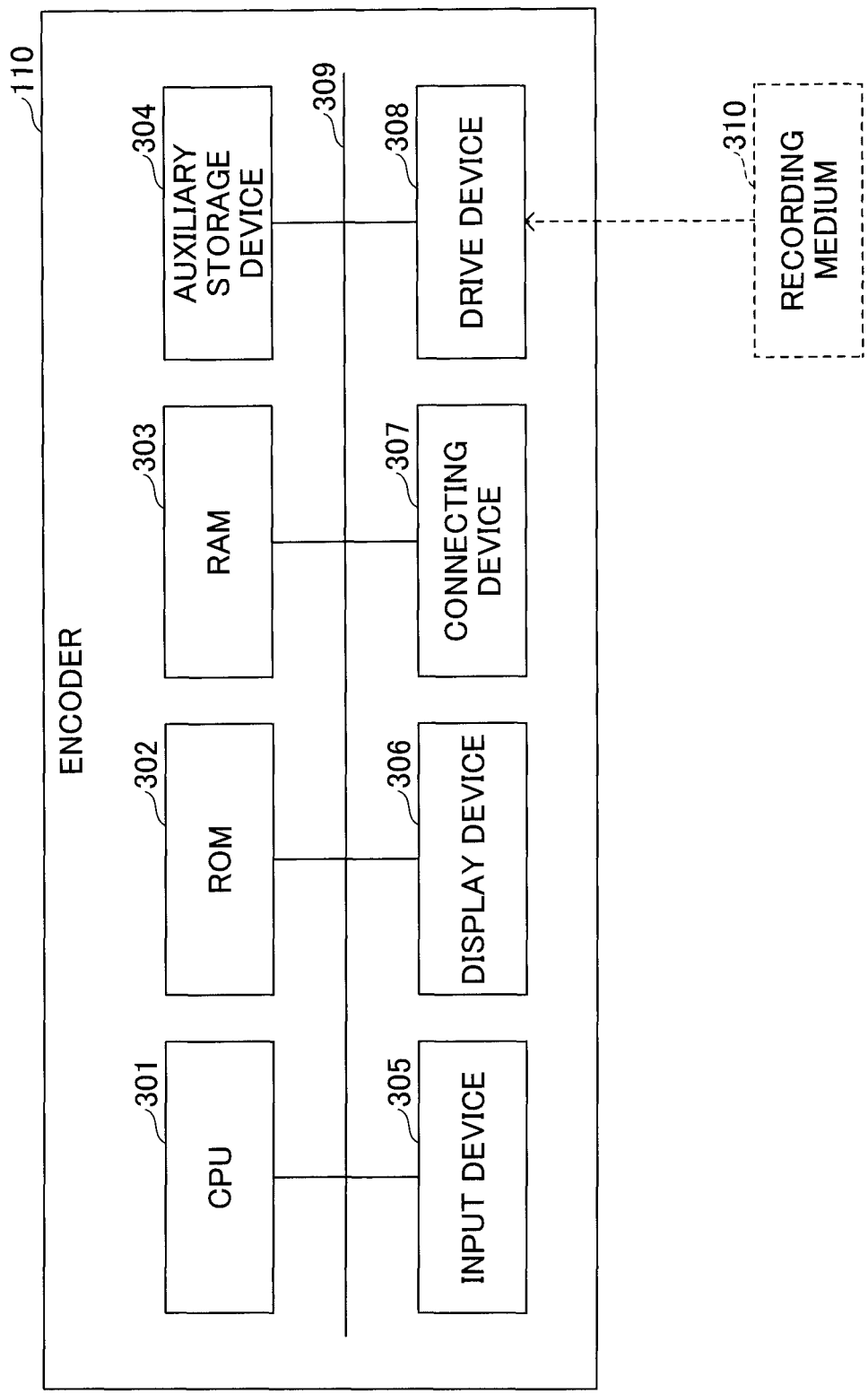
FIG. 3 is a drawing illustrating an example of a hardware configuration of the encoder.

FIG. 3 is a drawing illustrating an example of the hardware configuration of the encoder. As illustrated in FIG. 3, the encoder 110 includes a central processing unit (CPU) 301, a read only memory (ROM) 302, and a random access memory (RAM) 303. The CPU 301, the ROM 302, and the RAM 303 form what is called a computer. The encoder 110 also includes an auxiliary storage device 304, an input device 305, a display device 306, a connecting device 307, and a drive device 308. Each hardware of the encoder 110 is interconnected through a bus 309.

The CPU 301 executes various programs (for example, an encoding program) installed in the auxiliary storage device 304.

The ROM 302 is a non-volatile memory. The ROM 302 functions as a main storage device for storing various programs, data, and the like that are necessary for the CPU 301 to execute various programs installed in the auxiliary storage device 304. Specifically, the ROM 302 stores a boot program such as Basic Input/Output System (BIOS) and Extensible Firmware Interface (EFI).

The RAM 303 is a volatile memory such as a dynamic random access memory (DRAM) or a static random access memory (SRAM). The RAM 303 functions as a main storage device that provides a workspace in which various programs installed in the auxiliary storage device 304 are expanded when the various programs are executed by the CPU 301.

The auxiliary storage device 304 is an auxiliary storage device that stores installed various programs or information used in executing the various programs.

The input device 305 is an input device used for inputting various instructions to the encoder 110.

The display device 306 is a display device that displays internal information of the encoder 110. The connecting device 307 is a communication device for communication by connecting the encoder 110 to the decoder 120.

The drive device 308 is a device for setting a computer-readable recording medium 310. The recording medium 310 includes a medium that records information optically, electrically, or magnetically, such as a CD-ROM, a flexible disk, and a magneto-optical disk. Alternatively, the recording medium 310 may include a semiconductor memory or the like that electrically records information, such as the ROM, and a flash memory.

The various programs to be installed in the auxiliary storage device 304 may be installed, for example, by setting the distributed recording medium 310 in the drive device 308 and reading the various programs recorded in the recording medium 310 using the drive device 308. Alternatively, various programs to be installed in the auxiliary storage device 304 may be installed by downloading from the network 160 through the connecting device 307.

The hardware configuration illustrated in FIG. 3 is only an example, and it is clear that a portion of the hardware illustrated in FIG. 3 may be excluded or replaced with another hardware depending on an application form.

<3. Functional Configuration of the Encoder>

Figure 4:
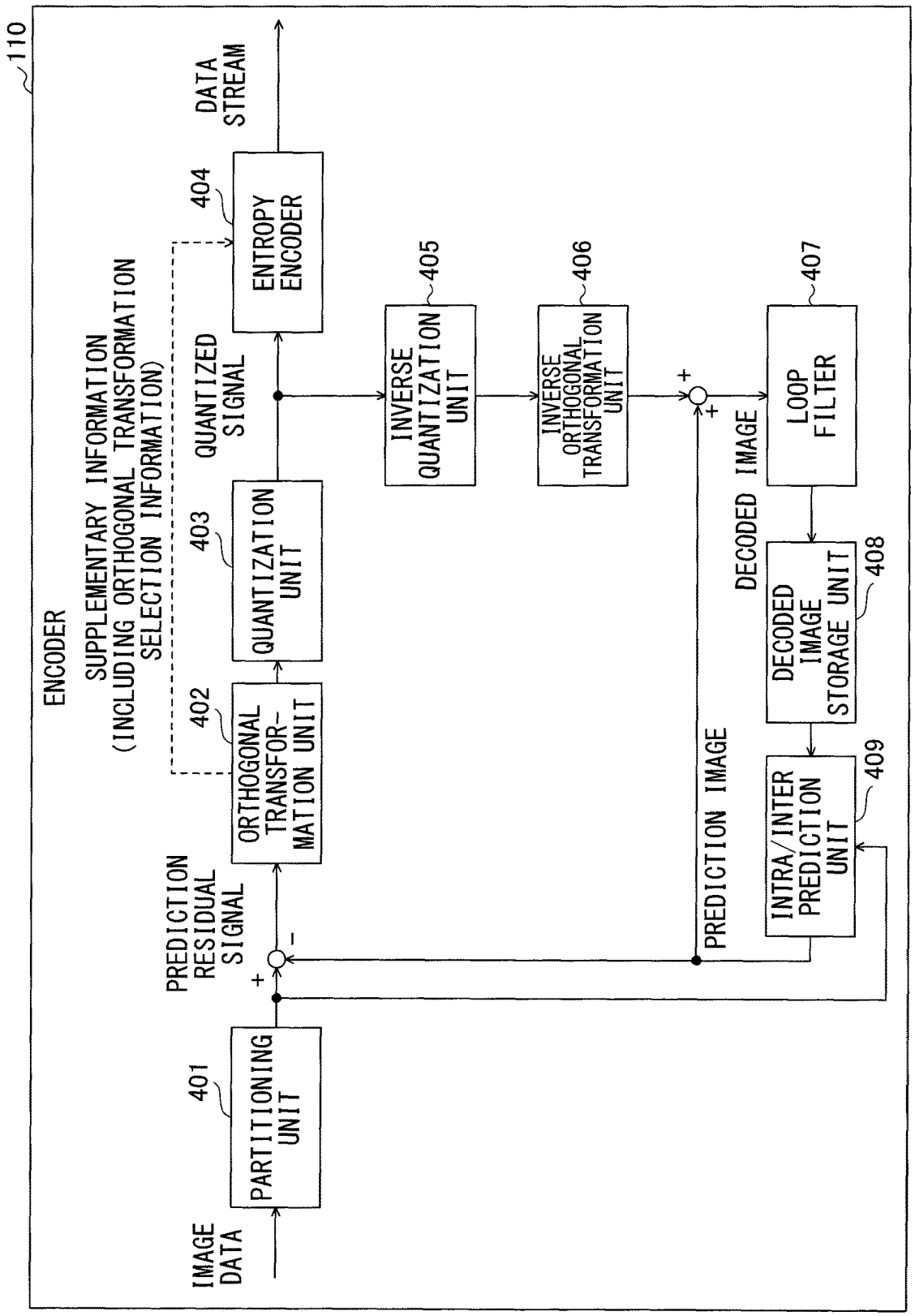
FIG. 4 is a drawing illustrating an example of a functional configuration of the encoder.

Next, a functional configuration of the encoder 110 that is achieved by executing an encoding program will be described. FIG. 4 is a drawing illustrating an example of the functional configuration of the encoder. As illustrated in FIG. 4, the encoder 110 includes a block partitioning unit 401, an orthogonal transformation unit 402, a quantization unit 403, and an entropy encoder 404. The encoder 110 includes an inverse quantization unit 405, an inverse orthogonal transformation unit 406, a loop filter 407, a decoded image storage unit 408, and an intra/inter prediction unit 409.

The block partitioning unit 401 recursively partitions input image data into blocks of coding units (CUs)) for each block of a coding tree unit (CTU). In a general (i.e., H.265/HEVC) block partitioning unit, each CU is further partitioned into a block of a prediction unit (PU) and a block of a transform unit (TU). However, in the international standard for the next generation codec following H.265/HEVC, it is expected to discontinue the PU and the TU and partition the CTU into only CUs. Thus, in the embodiment, the following description assumes that the block partitioning unit 401 partitions a block of the CTU into only CUs. According to contents discussed as the next generation codec following H.265/HEVC, the CTU size is 128×128 pixels or more. Thus, the following description assumes that the CTU size is 128×128 pixels.

The orthogonal transformation unit 402 performs an orthogonal transformation process on an input prediction residual signal. In a general (i.e., H.265/HEVC) orthogonal transformation unit, following types of orthogonal transformations are used.

When the size of a block on which the orthogonal transformation process is performed is 8×8 pixels or more, a discrete cosine transform-II (DCT-II) is used for both the inter prediction mode and the intra prediction mode.

When the size of a block on which the orthogonal transformation process is performed is 4×4 pixels, a discrete sine transform-VII (DST-VII) is used for the intra prediction mode.

According to the contents discussed as the next generation codec following H.265/HEVC, following types of orthogonal transformations are expected to be used.

In the intra prediction mode, DCT-II, DST-VII, DST-I, and DCT-VIII are used.

In the inter prediction mode, DCT-II, DST-VII, and DCT-VIII are used.

Thus, the following description assumes that the orthogonal transformation unit 402 performs the orthogonal transformation process based on the orthogonal transformation type that is expected to be used according to the contents discussed as the next generation codec. Information used by the orthogonal transformation unit 402 in the orthogonal transformation process to determine the orthogonal transformation type (orthogonal transformation selection information) is incorporated into data stream by the entropy encoder 404 as supplementary information after the orthogonal transformation process is executed.

The quantization unit 403 quantizes the prediction residual signal on which the orthogonal transformation process has been performed to generate a quantized signal and outputs the quantized signal to the entropy encoder 404 and the inverse quantization unit 405.

The entropy encoder 404 performs entropy encoding of the quantized signal to generate and output a data stream.

The inverse quantization unit 405 performs inverse quantization on the quantized signal and outputs a result to the inverse orthogonal transformation unit 406. The inverse orthogonal transformation unit 406 performs an inverse orthogonal transformation process on the quantized signal that is inversely quantized. A decoded image is generated by adding a signal obtained by the inverse orthogonal transformation unit 406 to a prediction image that is motion-compensated by the intra/inter prediction unit 409, for example, and the decoded image is input to the loop filter 407.

The loop filter 407 performs filter processing to reduce encoded noise of the decoded image. The filter processing of the loop filter 407 can prevent image quality degradation from being propagated between frames of the decoded image. The decoded image storage unit 408 stores the decoded image filtered by the loop filter 407.

The intra/inter prediction unit 409 performs the intra prediction (i.e., an intra-picture prediction) that generates a block of each CU of the prediction image using the decoded image. The intra/inter prediction unit 409 performs motion compensation based on the decoded image and performs the inter prediction (i.e., an inter-picture prediction) that generates a block of each CU of the prediction image.

Further, the intra/inter prediction unit 409 outputs a prediction image including either a block of each CU generated by the intra prediction or a block of each CU generated by the inter prediction.

The prediction image output from the intra/inter prediction unit 409 is used for residual calculation with the input image data, and is input to the orthogonal transformation unit 402 as the prediction residual signal. With respect to the prediction image output from the intra/inter prediction unit 409, the signal obtained by the inverse orthogonal transformation unit 406 is added to each CU block, and a result is input to the loop filter 407 as the decoded image.

<4. Characteristic of the Prediction Residual Signal>

Figure 5:
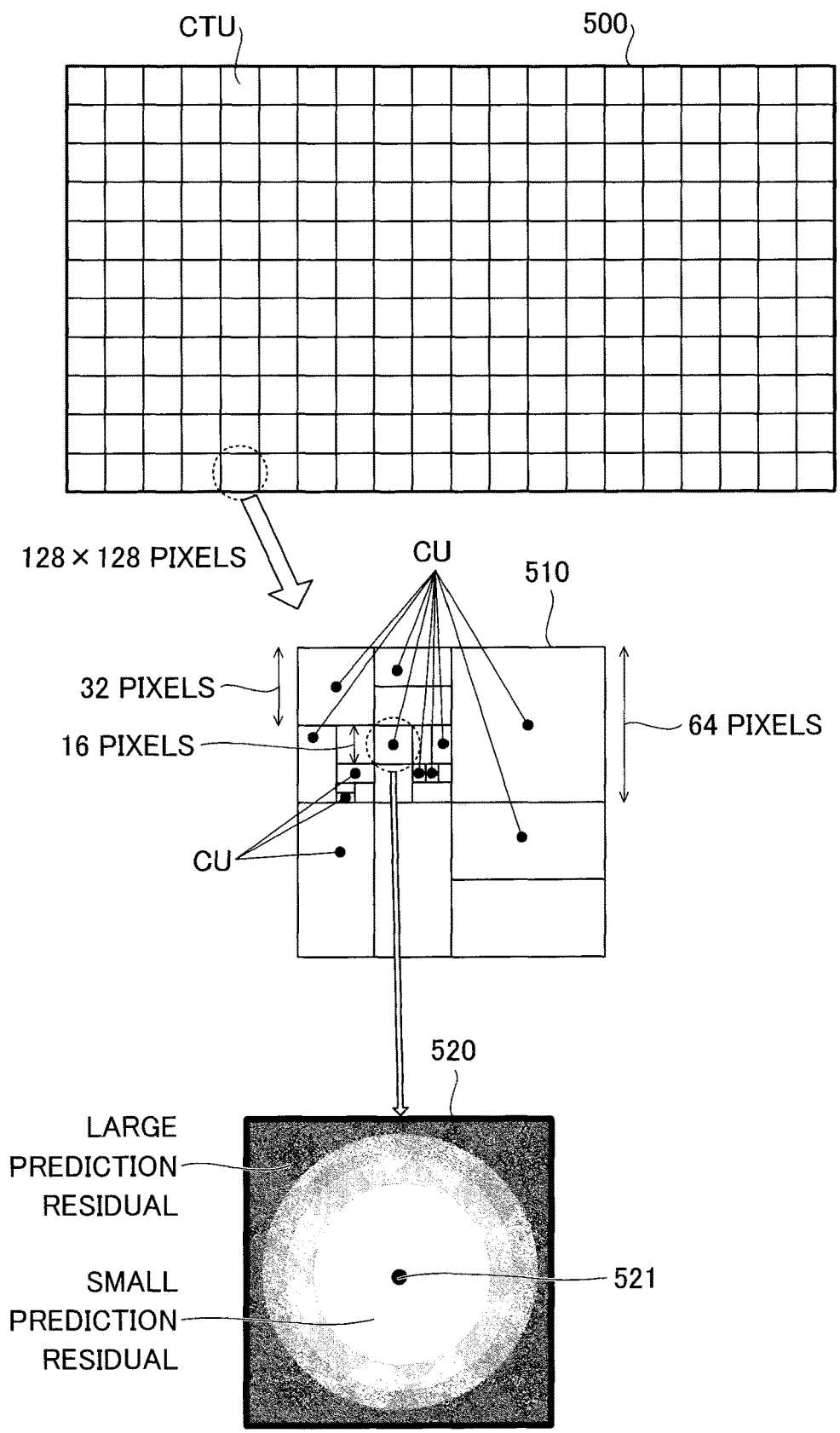
FIG. 5 is a drawing illustrating an example of a characteristic of a prediction residual signal in an inter prediction mode.

Next, a characteristic of the prediction residual signal on which the orthogonal transformation process is performed by the orthogonal transformation unit 402 will be described. FIG. 5 is a drawing illustrating an example of a characteristic of the prediction residual signal in the inter prediction mode. As illustrated in FIG. 5, the CTU with 128×128 pixels in image data 500 of the single frame is partitioned into CU blocks. Inter prediction is performed for each CU block, and the prediction residual signal obtained by the residual calculation with the input image data is input to the orthogonal transformation unit 402. The orthogonal transformation unit 402 determines a CU block that is a prediction block and performs the orthogonal transformation process on each of the determined CU blocks.

As illustrated in the CTU 510, a block of the CTU is partitioned into CU blocks of various sizes in the inter prediction. The examples illustrated in FIG. 5 include cases in which the block of the CTU is partitioned into square CU blocks (8×8 pixels, 16×16 pixels, 32×32 pixels, and 64×64 pixels). Further, the examples illustrated in FIG. 5 include cases in which the block of the CTU is partitioned into the rectangular CU blocks (4×8 pixels, 8×4 pixels, 8×16 pixels, 16×8 pixels, 16×32 pixels, 32×16 pixels, 32×64 pixels, 64×32 pixels, 64×128 pixels, and 128×64 pixels). Here, in the examples illustrated in FIG. 5, a CU block having an aspect ratio of 1:2 or 2:1 is illustrated as the rectangular CU block, but an aspect ratio of the rectangular CU block is not limited to this. For example, a rectangular CU block having an aspect ratio of 1:4 (or 4:1), 1:8 (or 8:1), and 1:16 (or 16:1) may be included.

The CU block 520 illustrates an enlarged view of a square block of 16×16 pixels that is partitioned. As illustrated in the CU block 520, in the inter prediction mode, the prediction residual signal has a characteristic that the prediction residual becomes larger with increasing distance from a center position 521. Here, in FIG. 5, a portion with high brightness indicates that a prediction residual is small and a portion with low brightness indicates that the prediction residual is large.

<5. Orthogonal Transformation Type>

Figure 6B:
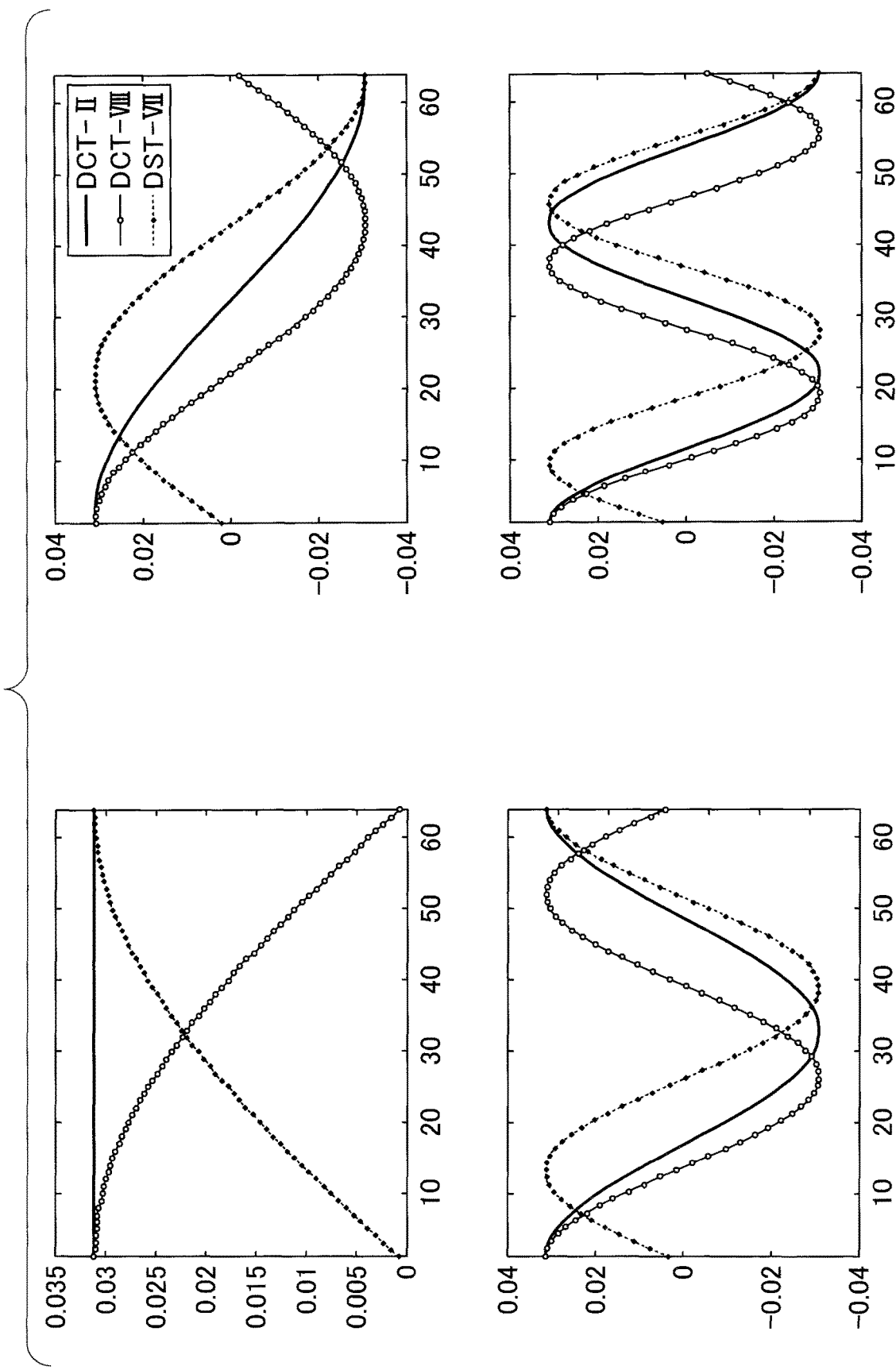
FIG. 6B is a drawing illustrating a type and a characteristic of orthogonal transformation.

Next, the orthogonal transformation type used when the orthogonal transformation unit 402 performs the orthogonal transformation process on the CU block on which the inter prediction is performed, will be described. FIGS. 6A and 6B are drawings illustrating the type and the characteristic of the orthogonal transformation.

As described above, in the inter prediction mode, the orthogonal transformation unit 402 uses three types of orthogonal transformations when performing the orthogonal transformation process. Specifically, the DCT-II, the DCT-VIII, and the DST-VII (see "orthogonal transformation type" in FIG. 6A). As the two-dimensional basis formula of each orthogonal transformation type illustrated in FIG. 6A is a general definition formula of the basis of each orthogonal transformation, the description will be omitted here.

As illustrated in the first row of "CHARACTERISTIC" in FIG. 6A, the orthogonal transformation type "DCT-II" has a characteristic of being suitable when the prediction residual signal is flat and a correlation between signals is high. Additionally, as illustrated in the second row of "characteristic" in FIG. 6A, the orthogonal transformation type "DCT-VIII" has a characteristic of being suitable for an unbalanced feature such that the prediction residual signal is large near a boundary of the CU block and the prediction residual signal becomes smaller with increasing distance from the block boundary. Further, as illustrated in the third row of "CHARACTERISTIC" in FIG. 6A, the orthogonal transformation type "DST-VII" has a characteristic of being suitable for an unbalanced feature such that the prediction residual signal is small near the block boundary and becomes larger with increasing distance from the block boundary. FIG. 6B visualizes these characteristics and illustrates a one-dimensional waveform of the basis of each orthogonal transformation type.

<6. Overview of the Orthogonal Transformation Process Performed by the Orthogonal Transformation Unit>

Next, an overview of the orthogonal transformation process performed by the orthogonal transformation unit 402 with respect to the CU block on which the inter prediction is performed, will be described. In order to explain the overview of the orthogonal transformation process performed by the orthogonal transformation unit 402, first, an orthogonal transformation process performed by a conventional orthogonal transformation unit (for example, an orthogonal transformation process performed by an orthogonal transformation unit of H.265/HEVC) will be described as a comparison.

<6.1 Orthogonal Transformation Process Performed by the Orthogonal Transformation Unit of H.265/HEVC>

As described above, in the orthogonal transformation of H.265/HEVC, the orthogonal transformation type that can be used in the inter prediction mode is only the DCT-II. The orthogonal transformation type "DCT-II" has a characteristic of being suitable when the prediction residual is flat and a correlation between signals is high (see the first row of FIG. 6A). With respect to the above, as illustrated in FIG. 5, the prediction residual signal in the inter prediction mode has a characteristic that the prediction residual becomes larger with increasing distance from the center position 521.

Thus, in the orthogonal transformation unit of H.265/HEVC, which applies the DCT-II to the prediction residual signal in the inter-prediction mode, the prediction residual signal at an outer peripheral portion of the block becomes a high frequency component, and a deviation toward a low frequency is small. Thus, there is a problem that encoding efficiency is decreased.

<6.2 Orthogonal Transformation Process Performed by the Orthogonal Transformation Unit 402 According to the Embodiment>

As described above, according to the contents discussed as the next generation codec following H.265/HEVC, it is expected to use the DCT-II, the DST-VII, and the DCT-VIII as the types of orthogonal transformations in the inter prediction mode. In consideration of such a problem, the embodiment performs the process as follows:

With taking characteristics of the DCT-II, the DST-VII, and the DCT-VIII into consideration, the CU block is partitioned to suit each characteristic. Specifically, in accordance with a size and a shape of the CU block, a block is partitioned into multiple rectangle shaped blocks that do not overlap each other to generate a "transform block".

An assignment of the DCT-II, the DST-VII, and the DCT-VIII to each transform block is determined based on a positional relationship of each transform block with respect to the center position of the CU block.

As described, the orthogonal transformation unit 402 according to the embodiment performs the orthogonal transformation process using different types of orthogonal transformations for respective transform blocks (i.e., a "transform block" indicates a unit to which the orthogonal transformation type is assigned).

As a result, according to the orthogonal transformation process performed by the orthogonal transformation unit 402 in the present embodiment, the encoding efficiency can be improved compared with the orthogonal transformation process performed by the orthogonal transformation unit of H.265/HEVC. Additionally, in the orthogonal transformation process performed by the orthogonal transformation unit 402 according to the present embodiment, the orthogonal transformation type is not determined based on the respective RD values after performing the orthogonal transformation process once using the DCT-II, DST-VII, and DCT-VIII. Therefore, calculation load on the encoder 120 can be suppressed.

In the following, a specific partitioning method for each CU block and an orthogonal transformation type to be assigned to each transform block will be described with examples of various sizes and various shapes of CU blocks.

(1) When the Shape of a CU Block is Square and the Size of a CU Block is 8×8 Pixels FIG. 7 is a first drawing illustrating a characteristic of the prediction residual signal in each transform block and the orthogonal transformation type assigned to each transform block, and illustrating that the shape of a CU block 700 is square and the block size is 8×8 pixels.

As illustrated in FIG. 7, in the CU block 700, the shape is square and the block size is small. Thus, the orthogonal transformation unit 402 partitions the CU block 700 into four transform blocks.

Specifically, four rectangular transform blocks are generated by partitioning the CU block 700, so that boundaries of the four rectangular transform blocks are symmetrical with respect to a horizontal line passing the center of the CU block 700 and are symmetrical with respect to a vertical line passing the center of the CU block 700.

Thus, for example, a transform block 701 (i.e., a transform block the right bottom vertex of which is at the center point of the CU block 700) has a characteristic that, in a vertical direction, the prediction residual becomes smaller with increasing distance from the boundary of the CU block 700, and in a horizontal direction, the prediction residual becomes smaller with increasing distance from the boundary of the CU block 700. Therefore, the orthogonal transformation unit 402 assigns the orthogonal transformation type "DCT-VIII" to the vertical direction and the orthogonal transformation type "DCT-VIII" to the horizontal direction with respect to the transform block 701 (see the first row of an assignment list 710).

A transform block 702 (i.e., a transform block the left bottom vertex of which is at the center point of the CU block 700) has a characteristic that, in the vertical direction, the prediction residual becomes smaller with increasing distance from the boundary of the CU block 700, and in the horizontal direction, the prediction residual becomes larger close to the boundary of the CU block 700. Therefore, the orthogonal transformation unit 402 assigns the orthogonal transformation type "DCT-VIII" to the vertical direction and the orthogonal transformation type "DST-VII" to the horizontal direction with respect to the transform block 702 (see the second row of the assignment list 710).

A transform block 703 (i.e., a transform block the right top vertex of which is at the center point of the CU block 700) has a characteristic that, in the vertical direction, the prediction residual becomes larger close to the boundary of the CU block 700, and in the horizontal direction, the prediction residual becomes smaller with increasing distance from the boundary of the CU block 700. Therefore, the orthogonal transformation unit 402 assigns the orthogonal transformation type "DST-VII" to the vertical direction and the orthogonal transformation type "DCT-VIII" to the horizontal direction with respect to the transform block 703 (see the third row of the assignment list 710).

A transform block 704 (i.e., a transform block the left top vertex of which is at the center point of the CU block 700) has a characteristic that, in the vertical direction, the prediction residual becomes larger close to the boundary of the CU block 700, and in the horizontal direction, the prediction residual becomes larger close to the boundary of the CU block 700. Therefore, the orthogonal transformation unit 402 assigns the orthogonal transformation type "DST-VII" to the vertical direction and the orthogonal transformation type "DST-VII" to the horizontal direction with respect to the transform block 704 (see the fourth row of the assignment list 710).

Figure 8:
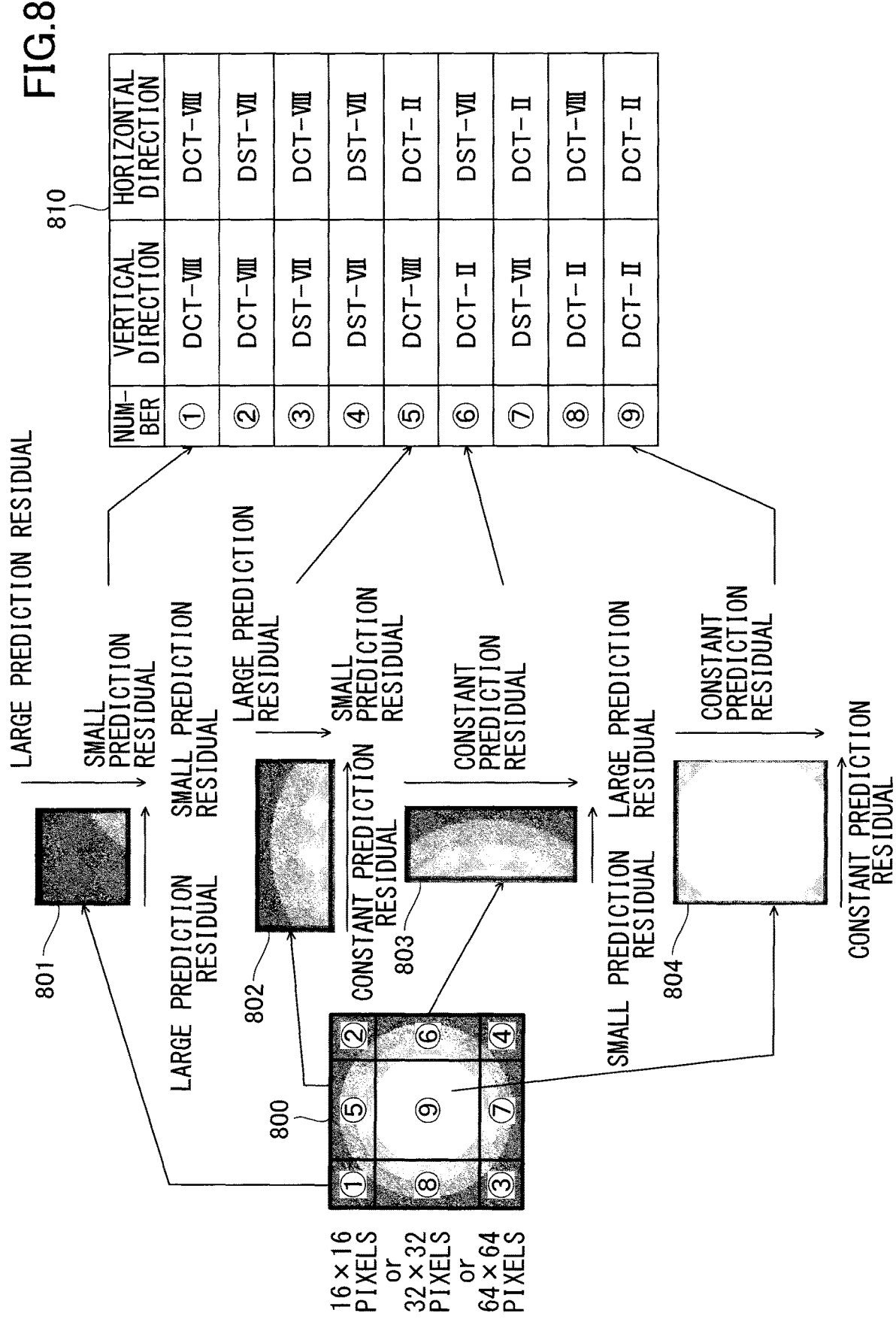
FIG. 8 is a second drawing illustrating a characteristic of a prediction residual signal in each transform block and an orthogonal transformation type applied to each transform block.
Figure 9A:
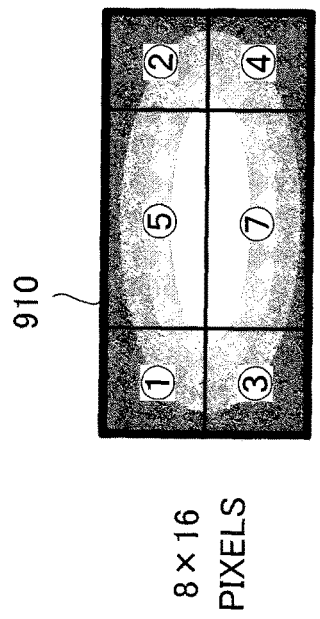
FIGS. 9A, 9B, 9C, and 9D are third drawings illustrating a characteristic of a prediction residual signal in each transform block and an orthogonal transformation type assigned to each transform block.
Figure 9B:
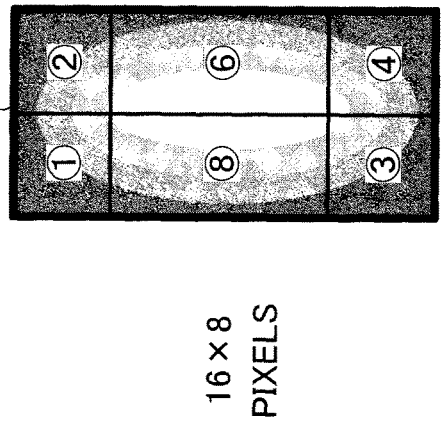
Figure 9C:
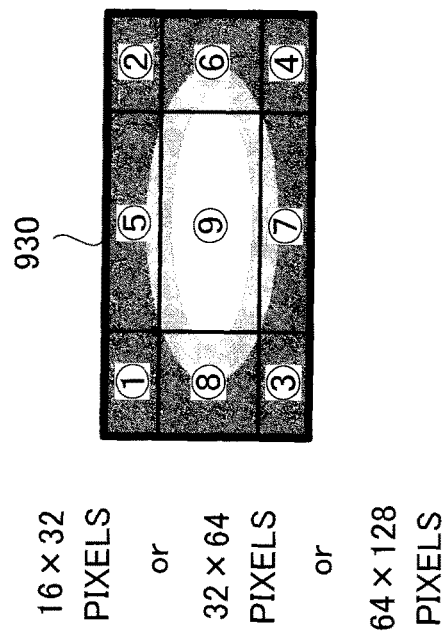
Figure 9D:
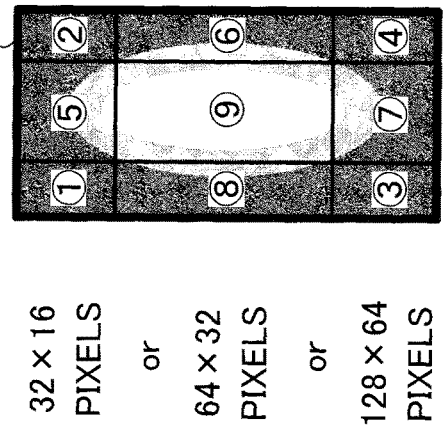

(2) When the Shape of a CU Block is Square and the Size of a CU Block is 16×16 Pixels FIG. 8 is a second drawing illustrating a characteristic of the prediction residual signal in each transform block and the orthogonal transformation type assigned to each transform block. In FIG. 8, the shape of a CU block 800 is square and a block size is 16×16 pixels (or 32×32 pixels, 64×64 pixels).

As illustrated in FIG. 8, in a CU block 800, the shape is square and the block size is large. Thus, the orthogonal transformation unit 402 partitions the CU block 800 into nine transform blocks. In FIG. 8, in a manner similar to FIG. 7, the CU block 800 is partitioned, so that boundaries of the nine transform blocks are symmetrical with respect to a horizontal line (which is not illustrated) passing the center of the CU block 800 and are symmetrical with respect to a vertical line (which is not illustrated) passing the center of the CU block 800.

Specifically, the orthogonal transformation unit 402 partitions the CU block 800 into three pieces in a ratio of 1:2:1 in the horizontal direction and three pieces in a ratio of 1:2:1 in the vertical direction. When it is assumed that the number of pixels on one side of the CU block 800 is n pixels, according to the orthogonal transformation unit 402, transform blocks are generated as follows:

Four transform blocks of $((n \times \frac{1}{4})$ pixels$)\times((n \times \frac{1}{4})$ pixels$)$
Two transform blocks of $((n \times \frac{1}{4})$ pixels$)\times((n \times \frac{1}{2})$ pixels$)$
Two transform blocks of $((n \times \frac{1}{2})$ pixels$)\times((n \times \frac{1}{4})$ pixels$)$
One transform block of $((n \times \frac{1}{2})$ pixels$)\times((n \times \frac{1}{2})$ pixels$)$ The transform blocks illustrated in FIG. 8 can be defined as follows (in the following definition, "upper left", "upper right", "lower left", and "lower right" refer to a positional relation when viewed from the center position of the CU block 800):

A transform block with circled number "1" (a transform block 801): a transform block the upper left vertex of which is at the upper left vertex of the CU block 800

A transform block with circled number "2": a transform block the upper right vertex of which is at the upper right vertex of the CU block 800

A transform block with circled number "3": a transform block the lower left vertex of which is at the lower left vertex of the CU block 800

A transform block with circled number "4": a transform block the lower right vertex of which is at the lower right vertex of the CU block 800

A transform block with circled number "5" (a transform block 802): a transform block between the transform block the upper left vertex of which is at the upper left vertex of the CU block 800 and the transform block the upper right vertex of which is at the upper right vertex of the CU block 800

A transform block with circled number "6" (a transform block 803): a transform block between the transform block the upper right vertex of which is at the upper right vertex of the CU block 800 and the transform block the lower right vertex of which is at the lower right vertex of the CU block 800

A transform block with circled number "7": a transform block between the transform block the lower left vertex of which is at the lower left vertex of the CU block 800 and the transform block the lower right vertex of which is at the lower right vertex of the CU block 800

A transform block with circled number "8": a transform block between the transform block the upper left vertex of which is at the upper left vertex of the CU block 800 and the transform block the lower left vertex of which is at the lower left vertex of the CU block 800

A transform block with circled number "9": a transform block that includes the center point of the CU block 800

Thus, for example, the transform block 801 has a characteristic that, in the vertical direction, the prediction residual becomes smaller with increasing distance from the boundary of the CU block 800, and in the horizontal direction, the prediction residual becomes smaller with increasing distance from the boundary of the CU block 800. Therefore, the orthogonal transformation unit 402 assigns the orthogonal transformation type "DCT-VIII" to the vertical direction and the orthogonal transformation type "DCT-VIII" to the horizontal direction with respect to the transform block 801 (see the first row of an assignment list 810).

The transform block 802 has a characteristic that, in the vertical direction, the prediction residual becomes smaller with increasing distance from the boundary of the CU block 800. The transform block 802 has a characteristic that, in the horizontal direction, the prediction residual remains constant regardless of a distance from the boundary of the CU block 800. Therefore, the orthogonal transformation unit 402 assigns the orthogonal transformation type "DCT-VIII" to the vertical direction and the orthogonal transformation type "DCT-II" to the horizontal direction with respect to the transform block 802 (see the fifth row of the assignment list 810).

The transform block 803 has a characteristic that, in the vertical direction, the prediction residual remains constant regardless of the distance from the boundary of the CU block 800, and in the horizontal direction, the prediction residual becomes larger close to the boundary of the CU block 800. Therefore, the orthogonal transformation unit 402 assigns the orthogonal transformation type "DCT-II" to the vertical direction and the orthogonal transformation type "DST-VII" to the horizontal direction with respect to the transform block 803 (see the sixth row of the assignment list 810).

The transform block 804 has a characteristic that, in the vertical direction, the prediction residual remains constant regardless of the distance from the boundary of the CU block 800, and in the horizontal direction, the prediction residual remains constant regardless of the distance from the boundary of the CU block 800. Therefore, the orthogonal transformation unit 402 assigns the orthogonal transformation type "DCT-II" to the vertical direction and the orthogonal transformation type "DCT-II" to the horizontal direction with respect to the transform block 804 (see the ninth row of the assignment list 810).

(3) When the Shape of a CU Block is Rectangular and the Size of a CU Block is 4×8 Pixels FIGS. 9A, 9B, 9C, and 9D are third drawings illustrating a characteristic of the prediction residual signal in each transform block and the orthogonal transformation type assigned to each transform block, and the shapes of CU blocks 910 to 940 are horizontally long rectangles or vertically long rectangles. In FIGS. 9A, 9B, 9C, and 9D, in a manner similar to FIGS. 7 and 8, the CU blocks 910 to 940 are partitioned, so that boundaries of the transform blocks are symmetrical with respect to a horizontal line (which is not illustrated) passing the center of each of the CU blocks 910 to 940 and are symmetrical with respect to a vertical line (which is not illustrated) passing the center of each of the CU blocks 910 to 940.

Among the CU blocks 910 to 940 illustrated in FIGS. 9A, 9B, 9C, and 9D, the shape of the CU block 910 is a horizontally long rectangle of 8×16 pixels, and the shape of the CU block 920 is a vertically long rectangle of 16×8 pixels. When the shape is a rectangle and the block size is small, the orthogonal transformation unit 402 partitions the CU block into six transform blocks.

Specifically, the orthogonal transformation unit 402 partitions the CU block 910 into three pieces in a ratio of 1:2:1 in the horizontal direction and two pieces in a ratio of 1:1 in the vertical direction. Each transform block can be defined as follows:

A transform block with circled number "1": a transform block the upper left vertex of which is at the upper left vertex of the CU block 910

A transform block with circled number "2": a transform block the upper right vertex of which is at the upper right vertex of the CU block 910

A transform block with circled number "3": a transform block the lower left vertex of which is at the lower left vertex of the CU block 910

A transform block with circled number "4": a transform block the lower right vertex of which is at the lower right vertex of the CU block 910

A transform block with circled number "5": a transform block between the transform block the upper left vertex of which is at the upper left vertex of the CU block 910 and the transform block the upper right vertex of which is at the upper right vertex of the CU block 910

A transform block with circled number "7": a transform block between the transform block the lower left vertex of which is at the lower left vertex of the CU block 910 and the transform block the lower right vertex of which is at the lower right vertex of the CU block 910

Here, as the orthogonal transformation type assigned to each transform block specified by the circled number is similar to the orthogonal transformation type in the assignment list 810 in FIG. 8, the description is not repeated.

Similarly, the orthogonal transformation unit 402 partitions the CU block 920 into two pieces in a 1:1 ratio in the horizontal direction and three pieces in a 1:2:1 ratio in the vertical direction. Each transform block can be defined as follows:

A transform block with circled number "1": a transform block the upper left vertex of which is at the upper left vertex of the CU block 920

A transform block with circled number "2": a transform block the upper right vertex of which is at the upper right vertex of the CU block 920

A transform block with circled number "3": a transform block the lower left vertex of which is at the lower left vertex of the CU block 920

A transform block with circled number "4": a transform block the lower right vertex of which is at the lower right vertex of the CU block 920

A transform block with circled number "6": a transform block between the transform block the upper right vertex of which is at the upper right vertex of the CU block 920 and the transform block the lower right vertex of which is at the lower right vertex of the CU block 920

A transform block with circled number "8": a transform block between the transform block the upper left vertex of which is at the upper left vertex of the CU block 920 and the transform block the lower left vertex of which is at the lower left vertex of the CU block 920

As the orthogonal transformation type assigned to each transform block specified by the circled number is similar to the orthogonal transformation type of the assignment list 810 in FIG. 8, the description is not repeated here.

With respect to the above, a CU block 930 is a horizontally long rectangle, and the block size is 16×32 pixels (or 32×64 pixels, or 64×128 pixels). A CU block 940 is a vertically long rectangle, and the block size is 32×16 pixels (or 64×32 pixels, or 128×64 pixels).

As described, when a CU block is a horizontally long rectangle (or a vertically long rectangle) and the block size is large, the orthogonal transformation unit 402 partitions the CU block into nine transform blocks.

Specifically, the orthogonal transformation unit 402 partitions the CU block 930 (or the CU block 940) into three pieces in a ratio of 1:2:1 in the horizontal direction and three pieces in a ratio of 1:2:1 in the vertical direction. When the number of pixels of a vertical side of the CU block 930 (or the CU block 940) is n pixels and the number of pixels of a horizontal side is m pixels, according to the orthogonal transformation unit 402, transform blocks are generated as follows:

Four transform blocks of ((n×¼) pixels)×((m×¼) pixels)
Two transform blocks of ((n×¼) pixels)×((m×½) pixels)
Two transform blocks of ((n×½) pixels)×((m×¼) pixels)
One transform block of ((n×½) pixels)×((m×½) pixels)

A definition of each transform block specified by the circled number is similar to the definition in FIG. 8. The orthogonal transformation type assigned to each transform block specified by the circled number is also similar to the orthogonal transformation type in the assignment list 810 of FIG. 8.

Here, it is necessary to be careful not to generate a too small transform block at partitioning. Specifically, it is necessary to prevent one side of a transform block from being smaller than four pixels. For the transform blocks, it is important that prediction errors in the block are in a homogenous state to some degree with the block being as large as possible, because an overhead caused by a too small transform block will be large.

<7. Functional Configuration of the Orthogonal Transformation Unit>

Next, a functional configuration of the orthogonal transformation unit 402 will be described. The orthogonal transformation unit 402 achieves the orthogonal transformation process described above (i.e., the orthogonal transformation process performed for each transform block using different types of orthogonal transformations) with achieving the orthogonal transformation process that has been proposed in the discussion process of the next generation codec following H.265/HEVC.

Here, the orthogonal transformation process that has been proposed in the discussion process of the next generation codec following H.265/HEVC will be described in further detail. In the discussion process of the next generation codec following H.265/HEVC, performing an orthogonal transformation process described below in the inter prediction mode, is proposed.

Compare a result of the orthogonal transformation process of the DCT-II with a result of an orthogonal transformation process of another basis, and select one Select either the DST-VII or the DCT-VIII for the horizontal direction and the vertical direction respectively, as a two-dimensional basis Additionally, in the discussion process of the next generation codec following H.265/HEVC, performing an orthogonal transformation process described below in the intra prediction mode, is proposed.

Select the orthogonal transformation type in accordance with the type of the intra prediction mode because different types of intra prediction modes have different characteristics of the prediction residual signal Compare a result of the orthogonal transformation process performed by using the DCT-II with a result of an orthogonal transformation process performed by using another basis, and select one Determine the orthogonal transformation type of another basis based on a transform set in accordance with the type of the intra prediction mode Select the orthogonal transformation of either the DST-VII or the DCT-VIII when a transform set is 0 Select the orthogonal transformation of either the DST-VII or DST-I when a transform set is 1 Select the orthogonal transformation of either the DST-VII or DCT-VIII when a transform set is 2

Figure 10:
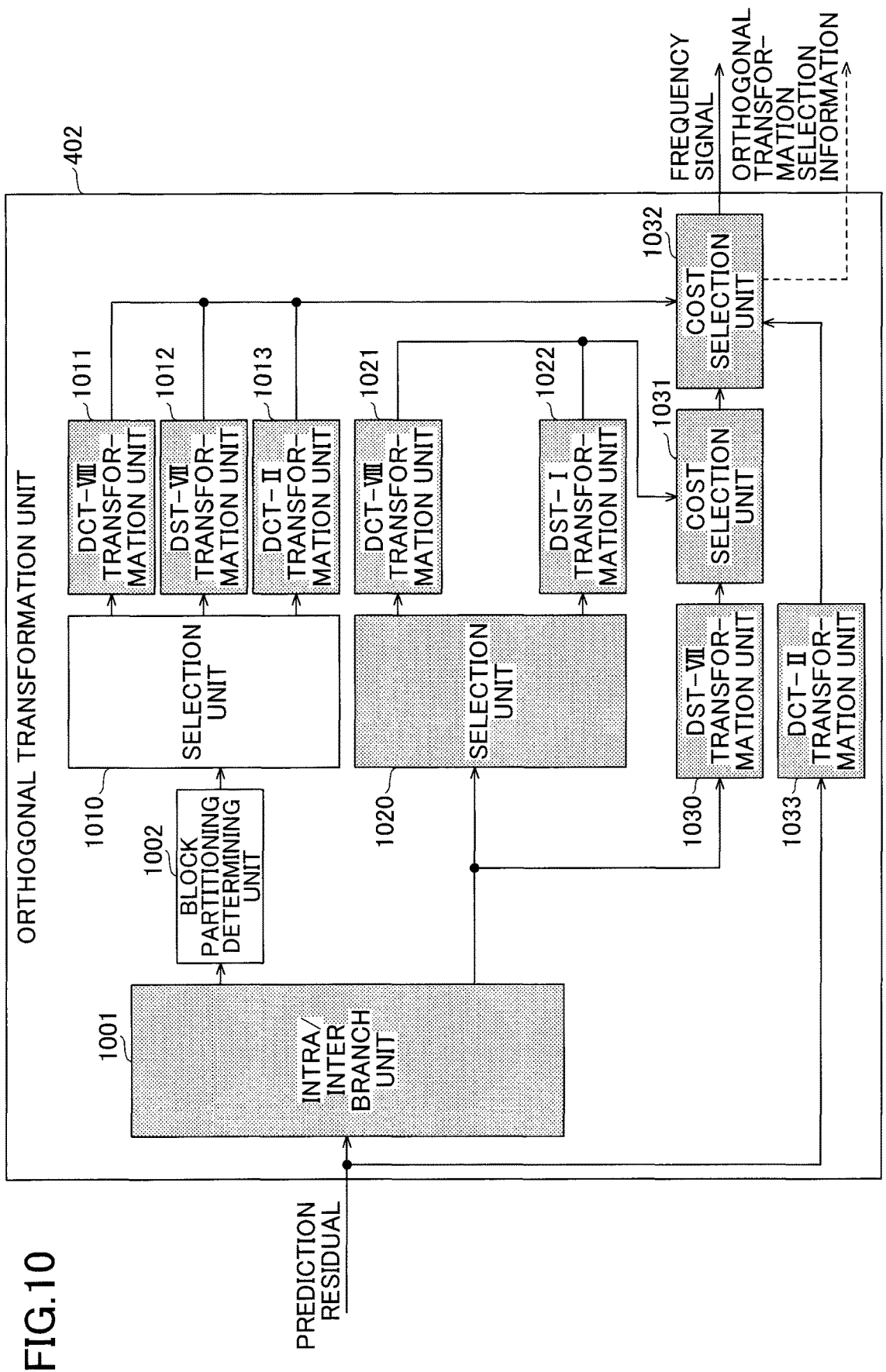
FIG. 10 is a drawing illustrating an example of a functional configuration of an orthogonal transformation unit.

FIG. 10 is a drawing illustrating an example of the functional configuration of the orthogonal transformation unit. As illustrated in FIG. 10, the orthogonal transformation unit 402 includes an intra/inter branch unit 1001, a block partitioning determining unit 1002, a selection unit 1010, and a DCT-VIII transformation unit 1011 to a DCT-II transformation unit 1013. The orthogonal transformation unit 402 also includes a selection unit 1020 and a DCT-VIII transformation unit 1021 to a DST-I transformation unit 1022. The orthogonal transformation unit 402 further includes a DST-VII transformation unit 1030, a cost selection unit 1031, a cost selection unit 1032, and a DCT-II transformation unit 1033.

Among these function blocks, shaded function blocks in FIG. 10 are examples of function blocks that achieve the orthogonal transformation process that has been proposed in the discussion process of the next generation codec following H.265/HEVC (i.e., the orthogonal transformation process that has been proposed by JVET). JVET stands for Joint Video Exploration Team.

Non-shaded function blocks in FIG. 10 are function blocks that achieve the above-described orthogonal transformation process (i.e., the orthogonal transformation process performed for respective transform blocks using different types of orthogonal transformations), that is, function blocks of the embodiment of the present invention. In the following, each function block will be described in order.

The intra/inter branch unit 1001 branches a process based on whether a CU block to be processed, of which the prediction residual signal has been calculated, is a block of the intra prediction mode or a block of the inter prediction mode.

When a CU block to be processed is a block of the intra prediction mode, the intra/inter branch unit 1001 notifies the selection unit 1020 and the DST-VII transformation unit 1030 of the CU block to be processed. When a CU block to be processed is a block of the inter prediction mode, the intra/inter branch unit 1001 notifies the block partitioning determining unit 1002 of the CU block to be processed.

The block partitioning determining unit 1002 is an example of a determining means. The block partitioning determining unit 1002 determines the shape (i.e., a square or a rectangle) and the block size of the CU block of the inter prediction mode, and whether the CU block is vertically long or horizontally long, to determine a partitioning method of the CU block. The block partitioning determining unit 1002 notifies the selection unit 1010 of a determined partitioning method with the CU block to be processed.

The selection unit 1010 is an example of a partitioning means. The selection unit 1010 partitions the CU block to be processed by the partitioning method determined by the block partitioning determining unit 1002 to generate multiple transform blocks (i.e., four, six, or nine). The selection unit 1010 is also an example of a determining means. The selection unit 1010 determines an orthogonal transformation type to be assigned to each transform block separately in the horizontal direction and in the vertical direction, sends the transform block to a transformation unit corresponding to the determined orthogonal transformation type, and sends an execution instruction of the orthogonal transformation process.

When the DCT-VIII transformation unit 1011 receives the transform block and an execution instruction from the selection unit 1010, the DCT-VIII transformation unit 1011 performs the orthogonal transformation process using the DCT-VIII on the received transform block.

When the DST-VII transformation unit 1012 receives the transform block and an execution instruction from the selection unit 1010, the DST-VII transformation unit 1012 performs the orthogonal transformation process of the DST-VII on the received transform block.

When the DCT-II transformation unit 1013 receives the transform block and an execution instruction from the selection unit 1010, the DCT-II transformation unit 1013 performs the orthogonal transformation process using the DCT-II on the received transform block.

When the selection unit 1020 receives the CU block to be processed from the intra/inter branch unit 1001, the selection unit 1020 sends the CU block to be processed to a transformation unit corresponding to a transform set predetermined in accordance with the type of the intra prediction mode. The selection unit 1020 sends an executing instruction of the orthogonal transformation process to a transformation unit corresponding to the transform set.

When DCT-VIII transformation unit 1021 receives the CU block to be processed and an execution instruction from the selection unit 1020, the DCT-VIII transformation unit 1021 performs the orthogonal transformation process using the DCT-VIII on the received CU block, and sends a processing result to the cost selection unit 1031.

When the DST-I transformation unit 1022 receives the CU block to be processed and an execution instruction from the selection unit 1020, the DST-I transformation unit 1022 performs the orthogonal transformation process of the DST-I on the received CU block, and sends a processing result to the cost selection unit 1031.

When the DST-VII transformation unit 1030 receives the CU block to be processed from the intra/inter branch unit 1001, the DST-VII transformation unit 1030 performs the orthogonal transformation process of the DST-VII on the received CU block and sends a processing result to the cost selection unit 1031.

The cost selection unit 1031 operates when the CU block to be processed is a block of the intra prediction mode. Specifically, the cost selection unit 1031 receives the processing result sent from either the DCT-VIII transformation unit 1021 or the DST-I transformation unit 1022 and receives the processing result sent from the DST-VII transformation unit 1030.

The cost selection unit 1031 calculates an RD value of the processing result sent from either the DCT-VIII transformation unit 1021 or the DST-I transformation unit 1022. The cost selection unit 1031 also calculates an RD value of the processing result received from the DST-VII transformation unit 1030. The cost selection unit 1031 compares the calculated RD values and determines the processing result used for calculating a smaller RD value, and determines the orthogonal transformation type used for calculating the processing result. The cost selection unit 1031 further notifies the cost selection unit 1032 of the determined processing result.

This enables the cost selection unit 1031 to compare the RD value of the processing result of the orthogonal transformation process of the DST-VII with the RD value of the processing result of the orthogonal transformation process of the DCT-VIII when the transform set is 0. When the transform set is 1, the cost selection unit 1031 can compare the RD value of the processing result of the orthogonal transformation process of the DST-VII with the RD value of the processing result of the orthogonal transformation process of the DST-I. Further, when the transform set is 2, the cost selection unit 1031 can compare the RD value of the processing result of the orthogonal transformation process of the DST-VII with the RD value of the processing result of the orthogonal transformation process of the DCT-VIII.

When the DCT-II transformation unit 1033 receives the CU block to be processed the prediction residual signal of which is calculated, the DCT-II transformation unit 1033 performs the orthogonal transformation process using the DCT-II on the received CU block and sends a processing result to the cost selection unit 1032.

When the inter prediction is performed, the cost selection unit 1032 receives the processing result sent from either the DCT-VIII transformation unit 1011, the DST-VII transformation unit 1012, or the DCT-II transformation unit 1013 (that is, the processing result of each transform block). The cost selection unit 1032 calculates the RD value of the CU block to be processed based on the received processing result of each transform block. The cost selection unit 1032 calculates the RD value of the CU block to be processed based on the received processing result from the DCT-II transformation unit 1033.

The cost selection unit 1032 compares the RD value of the CU block to be processed calculated based on the processing result of each transform block with the RD value of the CU block to be processed calculated based on the processing result received from the DCT-II transformation unit 1033. The cost selection unit 1032 determines the processing result used for calculating a smaller RD value. The cost selection unit 1032 outputs the determined processing result as a "frequency signal" with respect to the prediction residual signal when the inter prediction is performed. The cost selection unit 1032 outputs orthogonal transformation selection information in accordance with the determined processing result.

As described, when the inter prediction is performed, the cost selection unit 1032 compares the processing results described below, selects and outputs the processing result having a smaller RD value, and outputs the orthogonal transformation selection information in accordance with the selected processing result.

The processing result of the orthogonal transformation process performed using either the DCT-VIII, the DST-VII, or the DCT-II on each transform block generated by partitioning the CU block to be processed The processing result of the orthogonal transformation process performed using the DCT-II on the CU block to be processed Here, the orthogonal transformation selection information in accordance with the selected processing result is "0" when the processing result of the orthogonal transformation process of the DCT-II is selected, for example. The orthogonal transformation selection information is "1" when the processing result of the orthogonal transformation process of either the DCT-VIII, the DST-VII, or the DCT-II performed on each transform block, is selected.

Thus, the embodiment can be applied to the orthogonal transformation process that has been proposed in the discussion process of the next generation codec following H.265/HEVC. Additionally, in the orthogonal transformation process that has been proposed in the discussion process of the next generation codec, the orthogonal transformation selection information can be simplified by applying the embodiment, although the number of orthogonal transformation types that can be used when the inter prediction is performed, is increased. The reasons are as follows.

A transform block is generated in accordance with a characteristic of the prediction residual signal, and an orthogonal transformation type is assigned in accordance with the characteristic. A partitioning method is uniquely determined in accordance with the size and shape of a CU block, and when the partitioning method is determined, an orthogonal transformation type to be assigned to each transform block is uniquely determined.

When the intra prediction is performed, the cost selection unit 1032 receives the processing result sent from the cost selection unit 1031 and the processing result sent from the DCT-II transformation unit 1033. The cost selection unit 1032 calculates RD values of the CU block to be processed based on the received processing results and compares the RD values. The cost selection unit 1032 determines the processing result used for calculating a smaller RD value as a result of the comparison, and outputs the determined processing result as a "frequency signal" with respect to the prediction residual signal when the intra prediction is performed. Furthermore, the cost selection unit 1032 outputs the orthogonal transformation selection information (here, the orthogonal transformation type) in accordance with the determined processing result.

As described, when the intra prediction is performed, the cost selection unit 1032 selects and outputs a processing result with a smallest RD value among processing results described below and outputs an orthogonal transformation type used for calculating the selected processing result as the orthogonal transformation selection information.

Processing result of the orthogonal transformation process of either the DCT-VIII or the DST-I performed on the CU block to be processed Processing result of the orthogonal transformation process of the DST-VII Processing result of the orthogonal transformation process of the DCT-II <8. Flow of the Orthogonal Transformation Process>

Figure 11:
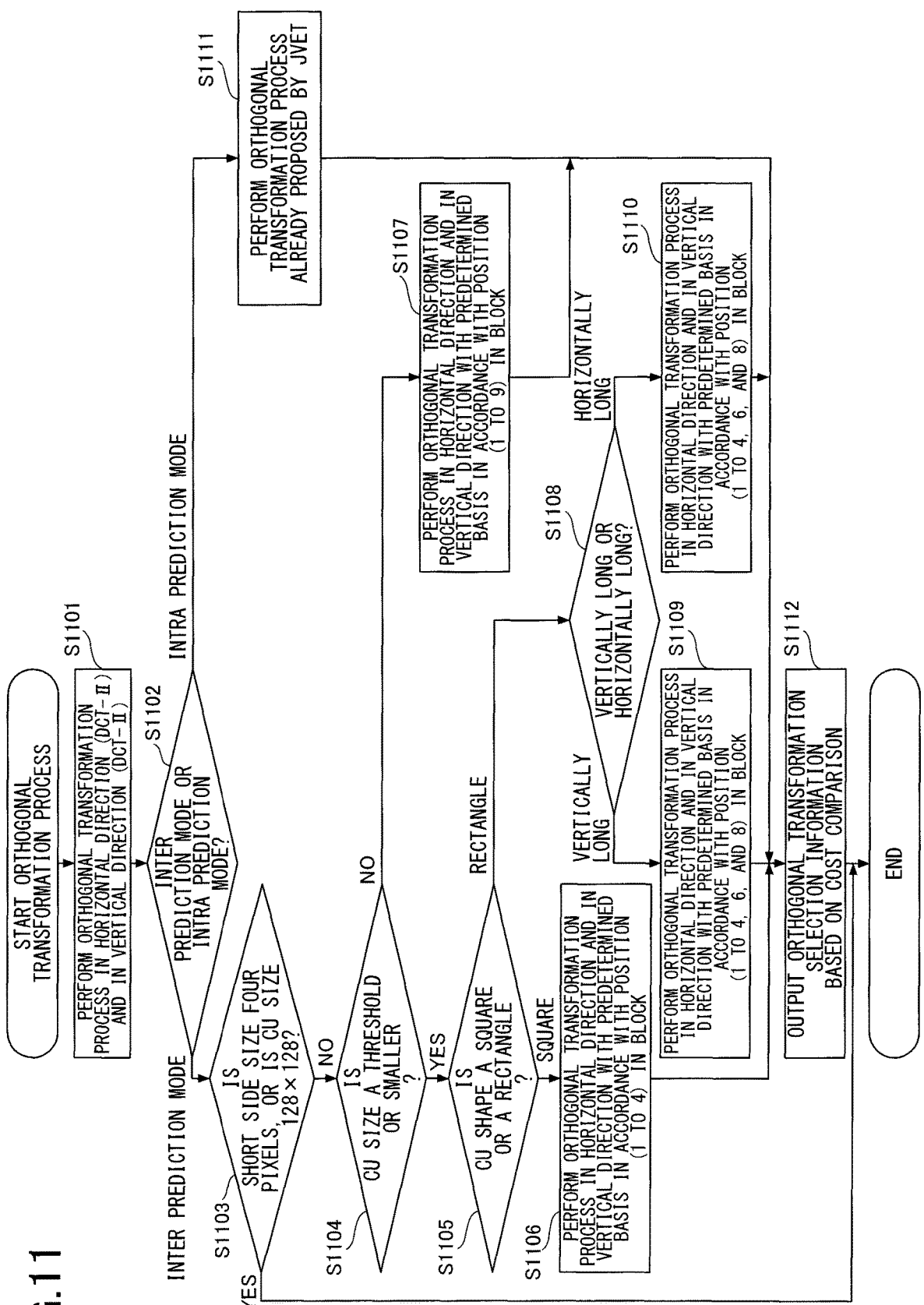
FIG. 11 is a flowchart illustrating a flow of an orthogonal transformation process performed by the orthogonal transformation unit.

Next, a flow of the orthogonal transformation process performed by the orthogonal transformation unit 402 will be described. FIG. 11 is a flowchart illustrating the flow of the orthogonal transformation process performed by the orthogonal transformation unit. Here, among CU blocks the prediction residual signals of which are calculated, the orthogonal transformation process for one predetermined block (the CU block to be processed) will be described.

In step S1101, the DCT-II transformation unit 1033 performs the orthogonal transformation process using the DCT-II in the horizontal direction and in the orthogonal transformation process using the DCT-II in the vertical direction on a CU block to be processed.

In step S1102, the intra/inter branch unit 1001 determines whether the CU block to be processed is a block of the intra prediction mode or a block of the inter prediction mode.

In step S1102, when it is determined that the CU block to be processed is a block of the inter prediction mode, the process proceeds to step S1103. In step S1103, the block partitioning determining unit 1002 determines whether the short side size of the CU block to be processed is four pixels. The block partitioning determining unit 1002 also determines whether the size of the CU block to be processed is 128×128 pixels.

When it is determined in step S1103 that the short side size is four pixels (i.e., YES in step S1103), the orthogonal transformation process on the CU block to be processed terminates. When it is determined that the size of the CU block to be processed is 128×128 pixels (i.e., YES in step S1103), the orthogonal transformation process on the CU block to be processed terminates. When the size of the CU block to be processed satisfies the condition of step S1103, the orthogonal transformation process is not performed on each transform block.

In step S1103, when it is determined that the short side size of the CU block to be processed is not four pixels and the entire size is not 128×128 pixels (i.e., No in step S1103), the process proceeds to step S1104.

In step S1104, the block partitioning determining unit 1002 determines whether the size of the CU block to be processed is equal to or smaller than a predetermined threshold value. In step S1104, when it is determined that the size of the CU block to be processed is equal to or smaller than the predetermined threshold value (i.e., YES in step S1104), the process proceeds to step S1105.

In step S1105, the block partitioning determining unit 1002 determines whether the shape of the CU block to be processed is a square or a rectangle. In step S1105, when it is determined that the shape of the CU block to be processed is a square, the process proceeds to step S1106.

In step S1106, the selection unit 1010 partitions the CU block to be processed to generate four transform blocks. The selection unit 1010 determines the orthogonal transformation type (see the assignment list 710 in FIG. 7) in accordance with a position of each of the four transform blocks. The selection unit 1010 sends the transform block to the transformation unit corresponding to the determined orthogonal transformation type (i.e., either the DCT-VIII transformation unit 1011 or the DST-VII transformation unit 1012) and notifies the transformation unit of an execution instruction. Then, the orthogonal transformation process is performed in the horizontal direction and in the vertical direction on each of the four transform blocks.

In Step S1104, when it is determined that the size of the CU block to be processed is not equal to or smaller than the predetermined threshold value (i.e., NO in Step S1104), the process proceeds to Step S1107.

In step S1107, the selection unit 1010 partitions the CU block to be processed to generate nine transform blocks. The selection unit 1010 determines the orthogonal transformation type in accordance with a position of each of the nine transform blocks (see the assignment list 810 in FIG. 8 and the CU blocks 930 and 940 in FIGS. 9C and 9D). The selection unit 1010 sends the transform block to the transformation unit corresponding to the determined orthogonal transformation type (i.e., either the DCT-VIII transformation unit 1011, the DST-VII transformation unit 1012, or the DCT-II transformation unit 1013) and notifies the transformation unit of an execution instruction. The, the orthogonal transformation process is performed in the horizontal direction and in the vertical direction on each of the nine transform blocks.

In step S1105, when it is determined that the CU block to be processed is a rectangle, the process proceeds to step S1108. In step S1108, the selection unit 1010 determines whether the CU block to be processed is a vertically long rectangle or a horizontally long rectangle.

In step S1108, when it is determined that the CU block to be processed is a vertically long rectangle, the process proceeds to step S1109. In step S1109, the selection unit 1010 partitions the CU block to be processed to generate six transform blocks. The selection unit 1010 determines the orthogonal transformation type in accordance with a position of each of the six transform blocks (see the CU block 920 in FIG. 9B). Further, the selection unit 1010 sends the transform block to the transformation unit corresponding to the determined orthogonal transformation type (i.e., either the DCT-VIII transformation unit 1011, the DST-VII transformation unit 1012, or the DCT-II transformation unit 1013) and notifies the transformation unit of an execution instruction. Then, the orthogonal transformation process is performed in the horizontal direction and in the vertical direction on each of the six transform blocks.

In step S1108, when it is determined that the CU block to be processed is a horizontally long rectangle, the process proceeds to step S1110. In step S1110, the selection unit 1010 partitions the CU block to be processed to generate six transform blocks. The selection unit 1010 determines the orthogonal transformation type in accordance with a position of each of the six transform blocks (see the CU block 910 in FIG. 9A). Further, the selection unit 1010 sends the transform block to the transformation unit corresponding to the determined orthogonal transformation type (i.e., either the DCT-VIII transformation unit 1011 or the DST-VII transformation unit 1012) and notifies the transformation unit of an execution instruction. Then, the orthogonal transformation process is performed in the horizontal direction and in the vertical direction on each of the six transform blocks.

In step S1102, when it is determined that the block is a block of the intra prediction mode, the process proceeds to step S1111. In step S1111, each unit of the selection unit 1020 to the DST-VII transformation unit 1030 performs the orthogonal transformation process that has been proposed in JVET (Joint Video Exploration Team).

In step S1112, the cost selection unit 1031 and the cost selection unit 1032 calculate and compare RD values of the CU block to be processed. For example, when the CU block to be processed is a block of the intra prediction mode, the cost selection unit 1031 and the cost selection unit 1032 compare an RD value calculated for each of the processing results in step S1101 and step S1111. When the CU block to be processed is a block of the inter prediction mode, the cost selection unit 1032 compares an RD value calculated for the processing result in step S1101 with an RD value calculated for the processing result in any of steps S1106, S1107, S1109, and S1110.

Further, the cost selection unit 1032 determines the processing result with which the smallest RD value is calculated based on the comparison result. The cost selection unit 1032 outputs the orthogonal transformation selection information in accordance with the determined processing result.

<9. Functional Configuration of the Decoder>

Figure 12:
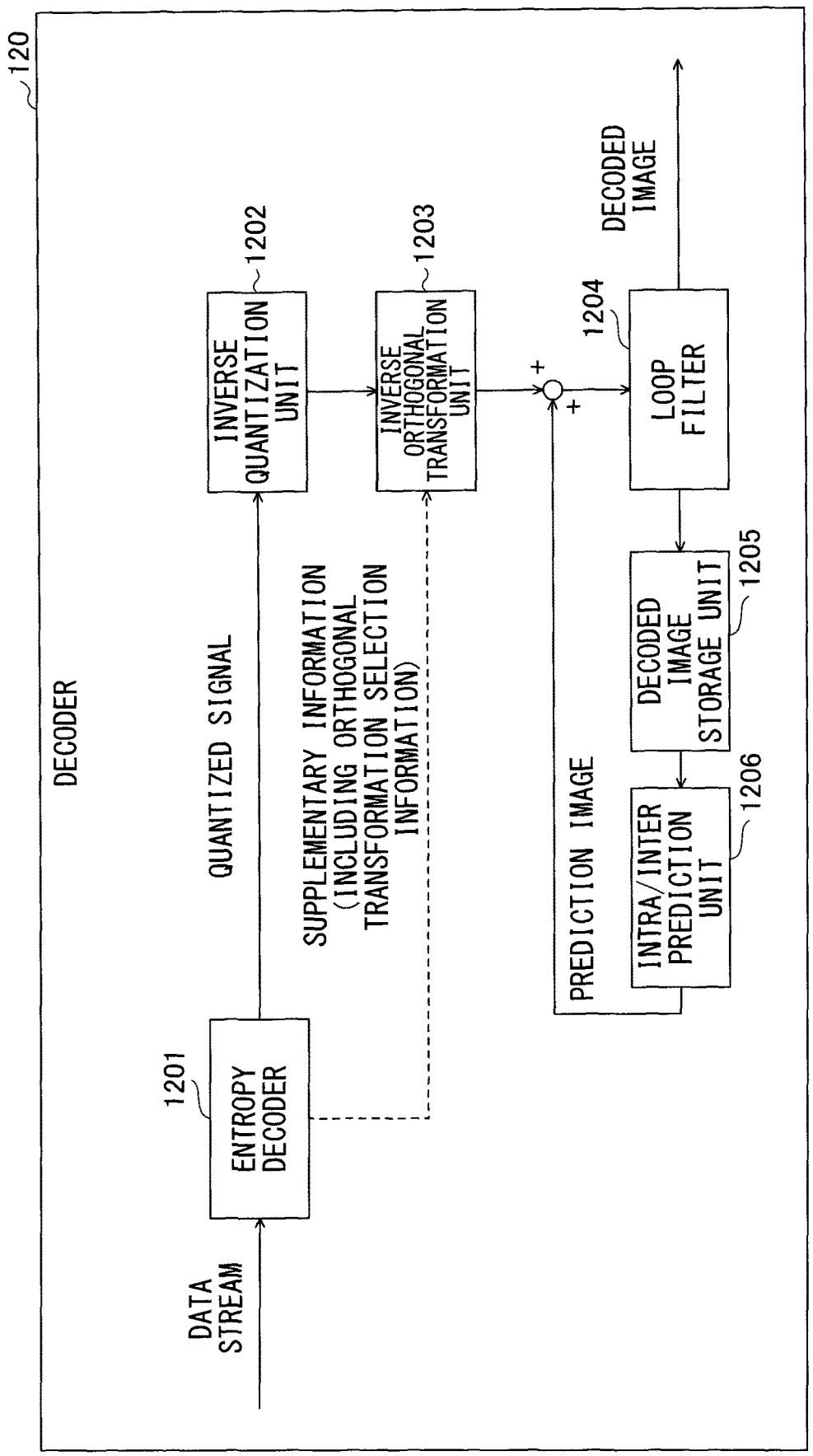
FIG. 12 is a drawing illustrating an example of a functional configuration of the decoder.

Next, a functional configuration of the decoder 120 achieved by executing a decoding program will be described. FIG. 12 is a drawing illustrating an example of the functional configuration of the decoder. As illustrated in FIG. 12, the decoder 120 includes an entropy decoder 1201, an inverse quantization unit 1202, an inverse orthogonal transformation unit 1203, a loop filter 1204, a decoded image storage unit 1205, and an intra/inter prediction unit 1206.

The entropy decoder 1201 decodes received data stream and outputs a quantized signal. The entropy decoder 1201 extracts the supplementary information (including the orthogonal transformation selection information or the like) from the data stream and notifies the inverse orthogonal transformation unit 1203.

The inverse quantization unit 1202 inversely quantizes the quantized signal and outputs the quantized signal that is inversely quantized to the inverse orthogonal transformation unit 1203. The inverse orthogonal transformation unit 1203 performs an inverse orthogonal transformation process on the quantized signal that is inversely quantized with referring to the supplementary information, thereby obtaining the prediction residual signal.

The prediction residual signal obtained by the inverse orthogonal transformation unit 1203 is added to each CU block of the prediction image that is motion-compensated by the intra/inter prediction unit 1206, thereby generating a decoded image, for example. The decoded image is input to the loop filter 1204.

The loop filter 1204 performs filter processing to reduce encoded noise of the input decoded image. The filter processing of the loop filter 1204 can prevent image quality degradation from being propagated between frames of the decoded image.

The loop filter 1204 outputs filtered decoded image as a decoded result and stores the decoded result in the decoded image storage unit 1205.

The intra/inter prediction unit 1206 performs the intra prediction that generates a block of each CU of the prediction image using a block of each CU of the decoded image. The intra/inter prediction unit 1206 performs motion compensation based on a block of each CU of frames of the decoded image and performs the inter prediction that generates a block of each CU of the prediction image.

Further, the intra/inter prediction unit 1206 outputs a prediction image including either a block of each CU generated by the intra prediction or a block of each CU generated by the inter prediction. The prediction residual signal obtained by the inverse orthogonal transformation unit 1203 is added to the output prediction image, and the output prediction image is input to the loop filter 1204 as a decoded image.

<10. Overview of the Inverse Orthogonal Transformation Process Performed by the Inverse Orthogonal Transformation Unit 1203 According to the Embodiment>

Figure 13A:
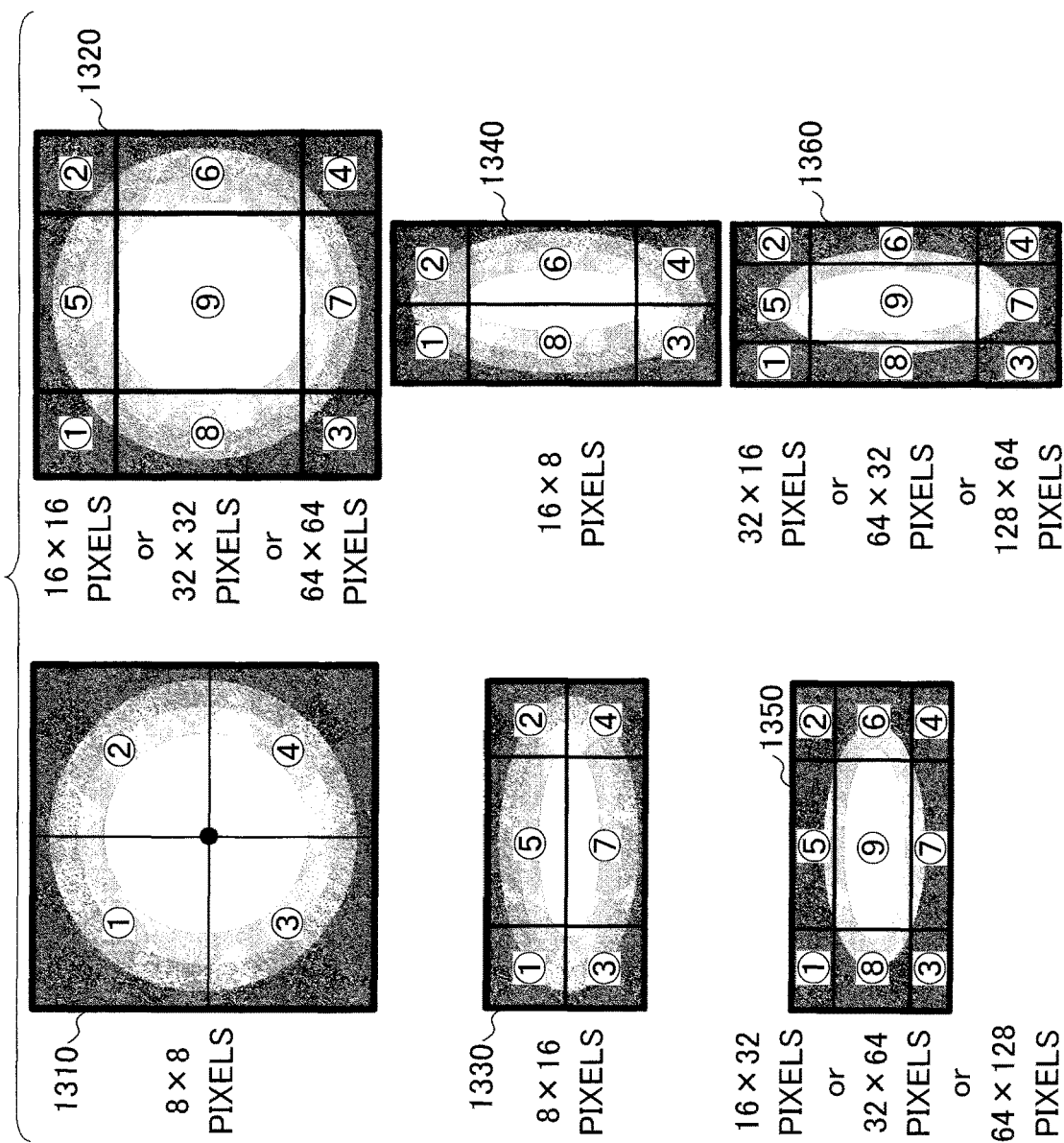
FIGS. 13A and 13B are drawings illustrating a characteristic of a prediction residual signal calculated in each transform block and an inverse orthogonal transformation type assigned to each transform block.
Figure 13B:
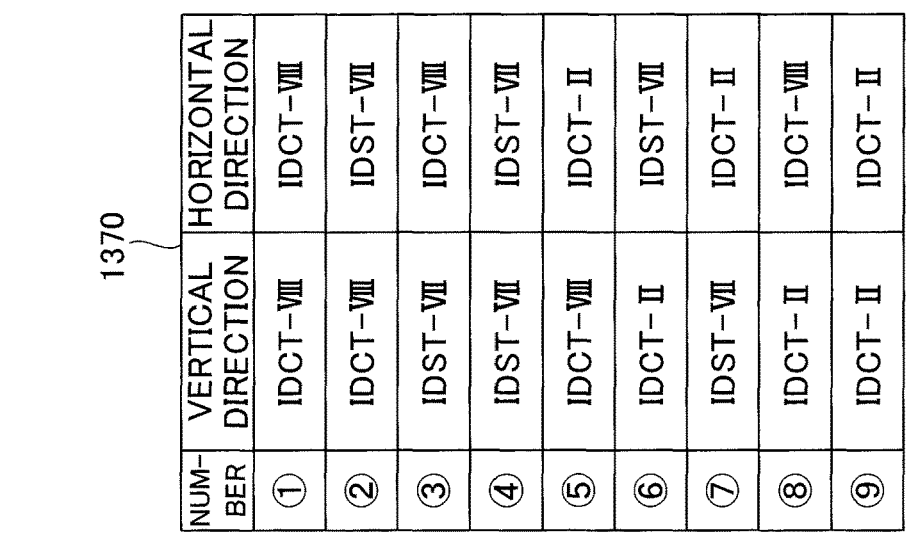

Next, an overview of the inverse orthogonal transformation process performed by the inverse orthogonal transformation unit 1203 with respect to a CU block on which the inter prediction is performed will be described. FIGS. 13A and 13B are drawings illustrating a characteristic of a prediction residual signal calculated in each transform block and an inverse orthogonal transformation type assigned to each transform block.

Here, variations of the size and the shape of a CU block to be processed on which the inverse orthogonal transformation unit 1203 performs the inverse orthogonal transformation process is the same as variations of the size and the shape of a CU block to be processed on which the orthogonal transformation unit 402 performs the orthogonal transformation process. Specifically, CU blocks 1310 to 1360 in FIG. 13A correspond to the CU block 700 in FIG. 7, the CU block 800 in FIG. 8, and the CU blocks 910 to 940 in FIGS. 9A, 9B, 9C, and 9D, respectively.

When the size and the shape are the same, the partitioning method for generating a transform block (i.e., the number of partitions and the partitioning position) is also the same. Furthermore, when the size and shape are the same and the partitioning method is the same, the same type of the inverse orthogonal transformation is assigned to each transform block. The assignment list 1370 in FIG. 13B corresponds to the assignment list 810 in FIG. 8.

<11. Functional Configuration of the Inverse Orthogonal Transformation>

Figure 14:
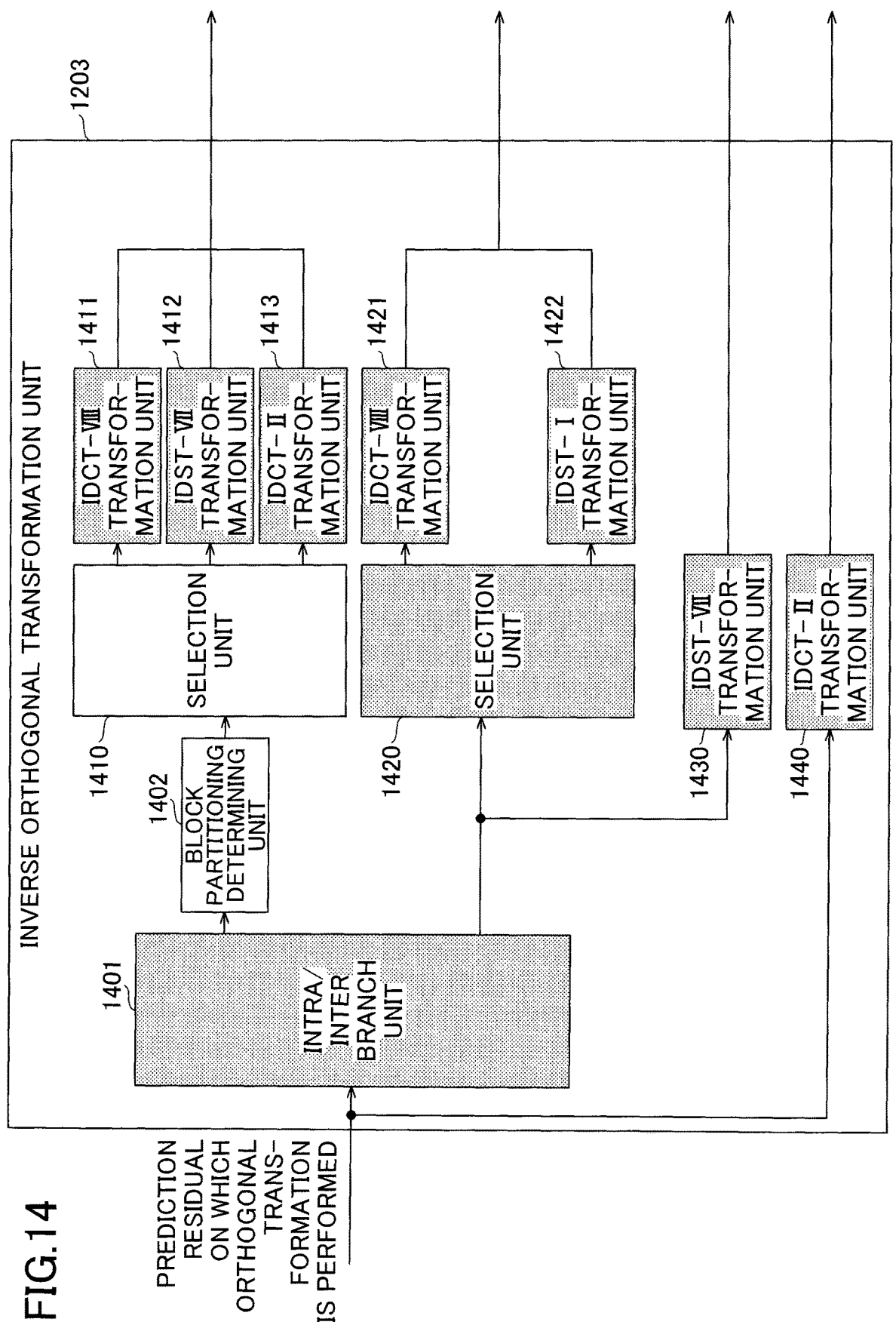
FIG. 14 is a drawing illustrating an example of a functional configuration of an inverse orthogonal transformation unit.

Next, a functional configuration of the inverse orthogonal transformation unit 1203 will be described. FIG. 14 is a drawing illustrating an example of the functional configuration of the inverse orthogonal transformation unit. In a manner similar to the functional configuration of the orthogonal transformation unit 402 (FIG. 10), shaded function blocks in FIG. 14 are examples of a function block that achieves an inverse orthogonal transformation process that has been proposed in the discussion process of the next generation codec following H.265/HEVC. Non-shaded function blocks achieve the above-described inverse orthogonal transformation process (i.e., the inverse orthogonal transformation process performed for respective transform blocks using different types of inverse orthogonal transformations), that is, function blocks of the embodiment of the present invention. In a manner similar to the functional block of the orthogonal transformation unit 402, a block partitioning determining unit 1402 is an example of a determining means in the decoder 120, and the selection unit 1410 is an example of a partitioning means and a determining means.

The functional configuration of the inverse orthogonal transformation unit 1203 is basically the same as the functional configuration of the orthogonal transformation unit 402, and differences between the functional configuration of the inverse orthogonal transformation unit 1203 and the functional configuration of the orthogonal transformation unit 402 are as follows:

An IDCT-VIII transformation unit 1411 to an IDCT-II transformation unit 1413 are arranged instead of the DCT-VIII transformation unit 1011 to the DCT-II transformation unit 1013.

An IDCT-VIII transformation unit 1421 to an IDST-I transformation unit 1422 are arranged instead of the DCT-VIII transformation unit 1021 to the DST-I transformation unit 1022.

An IDST-VII transformation unit 1430 is arranged instead of the DST-VII transformation unit 1030.

An IDCT-II transformation unit 1440 is arranged instead of the DCT-II transformation unit 1033.

The cost selection unit 1031 and the cost selection unit 1032 are not arranged.

A detailed description of each function block of the inverse orthogonal transformation unit 1203 will be omitted.

<12. Flow of the Inverse Orthogonal Transformation Process>

Figure 15:
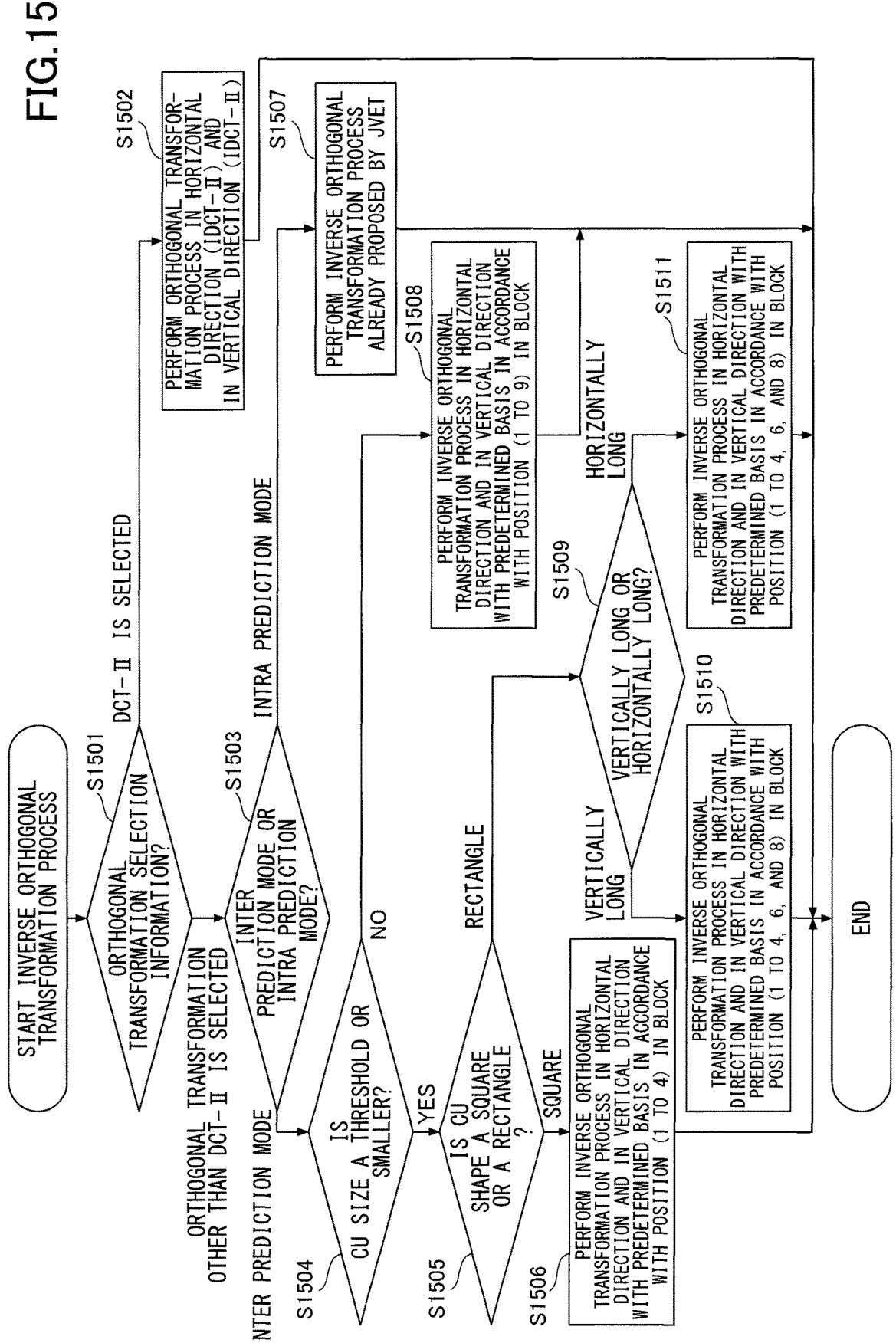
FIG. 15 is a flowchart illustrating a flow of an inverse orthogonal transformation process performed by the inverse orthogonal transformation unit.

Next, a flow of the inverse orthogonal transformation process performed by the inverse orthogonal transformation unit 1203 will be described. FIG. 15 is a flowchart illustrating a flow of the inverse orthogonal transformation process performed by the inverse orthogonal transformation unit. Here, among CU blocks the prediction residual signals of which are calculated, the inverse orthogonal transformation process for one predetermined block (the CU block to be processed) will be described.

In step S1501, the IDCT-II transformation unit 1440 obtains the orthogonal transformation selection information included in the supplementary information sent from the entropy decoder 1201 and determines whether the orthogonal transformation type is the DCT-II (i.e., whether the orthogonal transformation selection information is "0"). The intra/inter branch unit 1401 obtains the orthogonal transformation selection information included in the supplementary information sent from the entropy decoder 1201 and determines whether the orthogonal transformation type is other than the DCT-II (whether the orthogonal transformation selection information is "1").

In step S1501, when the IDCT-II transformation unit 1440 determines that the orthogonal transformation type used in the encoder 110 is the DCT-II (i.e., the orthogonal transformation selection information is "0"), the process proceeds to step S1502. In step S1502, the IDCT-II transformation unit 1440 performs the inverse orthogonal transformation process using the IDCT-II in the horizontal direction and in the vertical direction on the CU block to be processed.

In Step S1501, when the intra/inter branch unit 1401 determines that the orthogonal transformation type used in the encoder 110 is other than the DCT-II (i.e., the orthogonal transformation selection information is "1"), the process proceeds to step S1503. In step S1503, the intra/inter branch unit 1401 unit determines whether the CU block to be processed is a block of the intra prediction mode or a block of the inter prediction mode.

In step S1503, when it is determined that the CU block to be processed is a block of the inter prediction mode, the process proceeds to step S1504. In step S1504, the block partitioning determining unit 1402 determines whether the size of the CU block to be processed is equal to or smaller than a predetermined threshold value. In step S1504, when it is determined that the size of the CU block to be processed is equal to or smaller than the predetermined threshold value (YES in step S1504), the process proceeds to step S1505.

In step S1505, the block partitioning determining unit 1402 determines whether the shape of the CU block to be processed is a square or a rectangle. In step S1505, when it is determined that the shape is a square, the process proceeds to step S1506.

In step S1506, the selection unit 1410 partitions the CU block to be processed to generate four transform blocks. The selection unit 1410 determines the inverse orthogonal transformation type in accordance with a position of each of the four transform blocks (see the CU block 1310 illustrated in FIG. 13A). The selection unit 1410 sends the transform block to the transformation unit corresponding to the determined inverse orthogonal transformation type (either the IDCT-VIII transformation unit 1411 or the IDST-VII transformation unit 1412) and notifies the transformation unit of an execution instruction. Then, the inverse orthogonal transformation process is performed in the horizontal direction and in the vertical direction for each of the four transform blocks.

In step S1503, when it is determined that the CU block to be processed is a block of the intra prediction mode, the process proceeds to step S1507. In step S1507, each unit of the selection unit 1420 to the IDST-VII transformation unit 1430 performs the inverse orthogonal transformation process that has been proposed in JVET.

In step S1504, when it is determined that the size of the block to be processed is not equal to or smaller than the predetermined threshold value (NO in step S1504), the process proceeds to step S1508.

In step S1508, the selection unit 1410 partitions the CU block to be processed to generate nine transform blocks. The selection unit 1410 determines the inverse orthogonal transformation type in accordance with a position of each of the nine transform blocks (see the CU blocks 1320, 1350, and 1360 illustrated in FIG. 13A). The selection unit 1410 sends the transform block to the transformation unit corresponding to the determined inverse orthogonal transformation type (either the IDCT-VIII transformation unit 1411, the IDST-VII transformation unit 1412, or the IDCT-II transformation unit 1413) and notifies the transformation unit of an execution instruction. Then, the inverse orthogonal transformation process is performed in the horizontal direction and in the vertical direction for each of the nine transform blocks.

In step S1505, when it is determined that the CU block to be processed is a rectangle, the process proceeds to step S1509. In step S1509, the selection unit 1410 determines whether the CU block to be processed is a vertically long rectangle or a horizontally long rectangle.

In step S1509, when it is determined that the CU block to be processed is a vertically long rectangle, the process proceeds to step S1510. In step S1510, the selection unit 1410 partitions the CU block to be processed to generate six transform blocks. The selection unit 1410 determines the inverse orthogonal transformation type in accordance with a position of each of the six transform blocks (see the CU block 1340 illustrated in FIG. 13A). The selection unit 1410 sends the transform block to the transformation unit corresponding to the determined inverse orthogonal transformation type (either the IDCT-VIII transformation unit 1411, the IDST-VII transformation unit 1412, or the IDCT-II transformation unit 1413) and notifies the transformation unit of an execution instruction. Then, the inverse orthogonal transformation process is performed in the horizontal direction and in the vertical direction for each of the six transform blocks.

In step S1509, when it is determined that the CU block to be processed is a horizontally long rectangle, the process proceeds to step S1511. In step S1511, the selection unit 1410 partitions the CU block to be processed to generate six transform blocks. The selection unit 1410 determines the inverse orthogonal transformation type in accordance with a position of each of the six transform blocks (see the CU block 1330 illustrated in FIG. 13A). The selection unit 1410 sends the transform block to the transformation unit corresponding to the determined inverse orthogonal transformation type (either the IDCT-VIII transformation unit 1411, the IDST-VII transformation unit 1412, and the IDCT-II transformation unit 1413) and notifies the transformation unit of an execution instruction. Then, the inverse orthogonal transformation process is performed in the horizontal direction and in the vertical direction for each of the six transform blocks.

<13. Summary>

As is clear from the above description, when the orthogonal transformation unit of the encoder according to the first embodiment encodes the image data in the inter prediction mode, the orthogonal transformation unit performs the process as follows:

Determine the size and the shape of the CU block to be processed

Partition the CU block to be processed into multiple rectangular transform blocks in accordance with a partitioning method uniquely determined according to the determined size and shape Uniquely determine the orthogonal transformation type used when the orthogonal transformation process has been performed on each transform block in accordance with a positional relation between the center of the CU block and the transform block Thus, the orthogonal transformation unit of the encoder according to the first embodiment can match a characteristic of each orthogonal transformation type with a characteristic with respect to a position of each transform block partitioned from the CU block the prediction residual signal of which is calculated. Additionally, when the orthogonal transformation type is assigned to each transform block, it is not necessary to calculate a RD value.

As a result, the orthogonal transformation process can be performed in accordance with the characteristic at each position of a transform block of the CU block the prediction residual signal of which is calculated, thereby improving encoding efficiency. Additionally, calculation load of the encoder can be suppressed.

As described, the orthogonal transformation unit of the encoder according to the first embodiment can provide a determining method that can achieve improving the encoding efficiency and achieve suppressing the calculation load, as a determining method that determines the orthogonal transformation type used in the inter-picture prediction of the next generation codec.

When the orthogonal transformation unit of the decoder according to the first embodiment decodes an encoding sequence of an encoded image by the inter prediction mode, the orthogonal transformation unit performs the process as follows:

Determine the size and the shape of the CU block to be processed

Partition the CU block to be processed into multiple rectangular transform blocks in accordance with a partitioning method uniquely determined according to the determined size and shape Uniquely determine the inverse orthogonal transformation type used when the inverse orthogonal transformation process is performed on each transform block in accordance with a positional relation between the center of the CU block and the transform block Then, the inverse orthogonal transformation unit of the decoder according to the first embodiment can perform the inverse orthogonal transformation process of the orthogonal transformation type selected by the encoder.

Furthermore, according to the first embodiment, the encoder does not need to send the orthogonal transformation type for each transform block because the decoder can determine the inverse orthogonal transformation type in accordance with the size and the shape of the CU block, regardless of information from the encoder. As a result, the orthogonal transformation selection information sent by the encoder to the decoder can be simplified.

Second Embodiment

In the above-described first embodiment, a partitioning method is uniquely determined in accordance with the size and the shape of the CU block, and an assignment of the orthogonal transformation type to each transform block is uniquely determined for each partitioning method. However, in the above-described first embodiment, when a relationship between the size and shape of the CU block and the partitioning method is changed, it is necessary to renew the assignment of the orthogonal transformation type to each transform block for each partitioning method.

Thus, instead of determining the assignment for each partitioning method, the assignment of the orthogonal transformation type to each transform block may be determined in accordance with a distance, a direction, and the like of each transform block when viewed from a reference position in the CU block, for example. In this case, even when the relationship between the size and shape of the CU block and the partitioning method is changed, the assignment of the orthogonal transformation type to each transform block can be uniquely determined in accordance with the distance, direction, and the like from the reference position in the CU block. That is, the assignment of the orthogonal transformation type for each transform block can be automatically renewed. The reference position in the CU block can be considered to be a center position of the CU block, each vertex of the CU block, or each side of the CU block, for example.

Third Embodiment

In the above-described first embodiment, the orthogonal transformation selection information is defined as information for determining the orthogonal transformation type, and either "0" or "1" is sent. However, information sent as the orthogonal transformation selection information is not limited to a combination of "0" and "1", and any information indicating whether partitioning the CU block is required, may be used. This is because once it is determined that partitioning the CU block is required, the orthogonal transformation type is naturally determined by the size and shape of the CU block.

According to at least one embodiment, determining method of determining an orthogonal transformation type to be used at the inter-picture prediction in the next generation codec, can be provided.

It should be noted that the present invention is not limited to the above-described configurations, such as the configurations described in the above-described embodiments, and combinations with another element. These points can be modified without departing from the spirit of the present invention, and can be appropriately determined according to the application form.

What is claimed is:

1. An encoding method for encoding an image using an inter-picture prediction, the encoding method comprising:
    determining a prediction block on which the inter-picture prediction is to be performed;
    partitioning the prediction block into a plurality of transform blocks by a partitioning method that partitions the prediction block, so that boundaries of the plurality of transform blocks are symmetrical with respect to a horizontal line passing a center of the prediction block and are symmetrical with respect to a vertical line passing the center of the prediction block, the plurality of transform blocks being rectangular; and
    determining, for each of the plurality of transform blocks, an orthogonal transformation type used for each of a vertical direction and a horizontal direction of a given transform block of the plurality of transform blocks based on a positional relation between the given transform block and the center of the prediction block.

2. The encoding method as claimed in claim 1, wherein the orthogonal transformation type includes only a discrete cosine transform-VIII and a discrete sine transform-VII.

3. The encoding method as claimed in claim 1, wherein the partitioning the prediction block partitions the prediction block into four transform blocks that do not overlap with each other, the encoding method comprising
    performing an orthogonal transformation process in each of the horizontal direction and the vertical direction on each of the four transform blocks using either a discrete cosine transform-VIII or a discrete sine transform-VII.

4. The encoding method as claimed in claim 3, wherein the performing an orthogonal transformation process performs the orthogonal transformation in the vertical direction on a first transform block using the discrete cosine transform-VIII and the orthogonal transformation in the horizontal direction on the first transform block using the discrete sine transform-VII, the first transform block being a transform block a lower left vertex of which is at the center of the prediction block among the four transform blocks,
    performs the orthogonal transformation in the vertical direction on a second transform block using the discrete cosine transform-VIII and the orthogonal transformation in the horizontal direction on the second transform block using the discrete cosine transform-VIII, the second transform block being a transform block a lower right vertex of which is at the center of the prediction block among the four transform blocks,
    performs the orthogonal transformation in the vertical direction on a third transform block using the discrete sine transform-VII and the orthogonal transformation in the horizontal direction on the third transform block using the discrete cosine transform-VIII, the third transform block being a transform block an upper right vertex of which is at the center of the prediction block among the four transform blocks, and
    performs the orthogonal transformation in the vertical direction on a fourth transform block using the discrete sine transform-VII and the orthogonal transformation in the horizontal direction on the fourth transform block using the discrete sine transform-VII, the fourth transform block being a transform block an upper left vertex of which is at the center of the prediction block among the four transform blocks.

5. The encoding method as claimed in claim 1, wherein the partitioning the prediction block partitions the prediction block into three pieces in the vertical direction and in the horizontal direction to generate nine transform blocks that do not overlap with each other, the encoding method comprising
    performing an orthogonal transformation in the vertical direction on a first transform block using a discrete cosine transform-VIII and the orthogonal transformation in the horizontal direction on the first transform block using the discrete cosine transform-VIII, the first transform block being a transform block an upper left vertex of which is at an upper left vertex of the prediction block among the nine transform blocks,
    performing the orthogonal transformation in the vertical direction on a second transform block using the discrete cosine transform-VIII and the orthogonal transformation in the horizontal direction on the second transform block using a discrete sine transform-VII, the second transform block being a transform block an upper right vertex of which is at an upper right vertex of the prediction block among the nine transform blocks,
    performing the orthogonal transformation in the vertical direction on a third transform block using the discrete sine transform-VII and the orthogonal transformation in the horizontal direction on the third transform block using the discrete cosine transform-VIII, the third transform block being a transform block a lower left vertex of which is at a lower left vertex of the prediction block among the nine transform blocks, and
    performing, the orthogonal transformation in the vertical direction on a fourth transform block using the discrete sine transform-VII and the orthogonal transformation in the horizontal direction on the fourth transform block using the discrete sine transform-VII, the fourth transform block being a transform block a lower right vertex of which is at a lower right vertex of the prediction block among the nine transform blocks.

6. The encoding method as claimed in claim 5, the encoding method comprising:
  performing the orthogonal transformation in the vertical direction on a fifth transform block using the discrete cosine transform-VIII and the orthogonal transformation in the horizontal direction on the fifth transform block using the discrete cosine transform-II, the fifth transform block being a transform block between the first transform block and the second transform block amoung the nine transform blocks,
  performing the orthogonal transformation in the vertical direction on a sixth transform block using the discrete cosine transform-II and the orthogonal transformation in the horizontal direction on the sixth transform block using the discrete sine transform-VII, the sixth transform block being a transform block between the second transform block and the fourth transform block among the nine transform blocks,
  performing the orthogonal transformation in the vertical direction on a seventh transform block using the discrete sine transform-VII and the orthogonal transformation in the horizontal direction on the seventh transform block using the discrete cosine transform-II, the seventh transform block being a transform block between the third transform block and the fourth transform block among the nine transform blocks, and
  performing the orthogonal transformation in the vertical direction on an eighth transform block using the discrete cosine transform-II and the orthogonal transformation in the horizontal direction on the eighth transform block using the discrete cosine transform-VIII, the eighth transform block being a transform block between the first transform block and the third transform block among the nine transform blocks.

7. The encoding method as claimed in claim 5, the encoding method comprising
  performing the orthogonal transformation in the vertical direction on a ninth transform block using the discrete cosine transform-II and the orthogonal transformation in the horizontal direction on the ninth transform block using the discrete cosine transform-II, the ninth transform block being a transform block including the center of the prediction block among the nine transform blocks.

8. The encoding method as claimed in claim 1, wherein the partitioning the prediction block partitions the prediction block into two pieces in the vertical direction and into three pieces in the horizontal direction to generate six transform blocks that do not overlap with each other, when the prediction block is horizontally long, the encoding method comprising
  performing an orthogonal transformation in the vertical direction on a first transform block using a discrete cosine transform-VIII and the orthogonal transformation in the horizontal direction on the first transform block using the discrete cosine transform-VIII, the first transform block being a transform block an upper left vertex of which is at an upper left vertex of the prediction block among the six transform blocks,
  performing the orthogonal transformation in the vertical direction on a second transform block using the discrete cosine transform-VIII and the orthogonal transformation in the horizontal direction on the second transform block using a discrete sine transform-VII, the second transform block being a transform block an upper right vertex of which is at an upper right vertex of the prediction block among the six transform blocks,
  performing the orthogonal transformation in the vertical direction on a third transform block using the discrete sine transform-VII and the orthogonal transformation in the horizontal direction on the third transform block using the discrete cosine transform-VIII, the third transform block being a transform block a lower left vertex of which is at a lower left vertex of the prediction block among the six transform blocks, and
  performing the orthogonal transformation in the vertical direction on a fourth transform block using the discrete sine transform-VII and the orthogonal transformation in the horizontal direction on the fourth transform block using the discrete sine transform-VII, the fourth transform block being a transform block a lower right vertex of which is at a lower right vertex of the prediction block among the six transform blocks.

9. The encoding method as claimed in claim 8, the encoding method comprising:
  performing the orthogonal transformation in the vertical direction on a fifth transform block using the discrete cosine transform-VIII and the orthogonal transformation in the horizontal direction on the fifth transform block using the discrete cosine transform-II, the fifth transform block being a transform block between the first transform block and the second transform block among the six transform blocks, and
  performing the orthogonal transformation in the vertical direction on a sixth transform block using the discrete sine transform-VII and the orthogonal transformation in the horizontal direction on the sixth transform block using the discrete cosine transform-II, the sixth transform block being a transform block between the third transform block and the fourth transform block among the six transform blocks.

10. The encoding method as claimed in claim 1, wherein the partitioning the prediction block partitions the prediction block into three pieces in the vertical direction and into two pieces in the horizontal direction to generate six transform blocks that do not overlap with each other, when the prediction block is vertically long, the encoding method comprising
  performing an orthogonal transformation in the vertical direction on a first transform block using a discrete cosine transform-VIII and the orthogonal transformation in the horizontal direction on the first transform block using the discrete cosine transform-VIII, the first transform block being a transform block an upper left vertex of which is at an upper left vertex of the prediction block among the six transform blocks,
  performing the orthogonal transformation in the vertical direction on a second transform block using the discrete cosine transform-VIII and the orthogonal transformation in the horizontal direction on the second transform block using a discrete sine transform-VII, the second transform block being a transform block an upper right vertex of which is at an upper right vertex of the prediction block among the six transform blocks,
  performing the orthogonal transformation in the vertical direction on a third transform block using the discrete sine transform-VII and the orthogonal transformation in the horizontal direction on the third transform block using the discrete cosine transform-VIII, the third transform block being a transform block a lower left vertex of which is at a lower left vertex of the prediction block among the six transform blocks, and
  performing the orthogonal transformation in the vertical direction on a fourth transform block using the discrete sine transform-VII and the orthogonal transformation in the horizontal direction on the fourth transform block using the discrete sine transform-VII, the fourth transform block being a transform block a lower right vortex of which is at a lower right vertex of the prediction block among the six transform blocks.

11. The encoding method as claimed in claim 10, the encoding method comprising:
performing the orthogonal transformation in the vertical direction on a fifth transform block using the discrete cosine transform-II and the orthogonal transformation in the horizontal direction on the fifth transform block using the discrete cosine transform-VIII, the fifth transform block being a transform block between the first transform block and the third transform block among the six transform blocks, and
performing the orthogonal transformation in the vertical direction on a sixth transform block using the discrete cosine transform-II and the orthogonal transformation in the horizontal direction on the sixth transform block using the discrete sine transform-VII, the sixth transform block being a transform block between the second transform block and the fourth transform block among the six transform blocks.

12. A decoding method for decoding an encoding sequence of an encoded image using an inter-picture prediction, the decoding method comprising:
determining a prediction block on which the inter-picture prediction is to be performed;
partitioning the prediction block into a plurality of transform blocks by a partitioning method that partitions the prediction block, so that boundaries of the plurality of transform blocks are symmetrical with respect to a horizontal line passing a center of the prediction block and are symmetrical with respect to a vertical line passing the center of the prediction block, the plurality of transform blocks being rectangular; and
determining, for each of the plurality of transform blocks, an inverse orthogonal transformation type used for each of a vertical direction and a horizontal direction of a given transform block of the plurality of transform blocks based on a positional relation between the given transform block and the center of the prediction block.

13. The decoding method as claimed in claim 12, wherein the determining a prediction block determines a size and a shape of the prediction block and determines the partitioning method based on the determined size and shape.

14. The decoding method as claimed in claim 13, the decoding method comprising
obtaining information indicating whether partitioning is required for each prediction block, wherein the partitioning the prediction block partitions the prediction block into the plurality of transform blocks when the obtaining information obtains information indicating that partitioning is required.

15. The decoding method as claimed in claim 12, wherein the partitioning the prediction block partitions the prediction block into tour transform blocks that do not overlap with each other, the decoding method comprising
performing an inverse orthogonal transformation process in each of the horizontal direction and the vertical direction on each of the four transform blocks using either an inverse discrete cosine transform-VIII or an inverse discrete sine transform-VII.

16. The decoding method as claimed in claim 15, wherein the performing an inverse orthogonal transformation process performs the inverse orthogonal transformation in the vertical direction on a first transform block using the inverse discrete cosine transform-VIII and the inverse orthogonal transformation in the horizontal direction on the first transform block using the inverse discrete sine transform-VII, the first transform block being a transform block a lower left vertex of which is at the center of the prediction block among the four transform blocks,
performs the inverse orthogonal transformation in the vertical direction on a second transform block using the inverse discrete cosine transform-VIII and the inverse orthogonal transformation in the horizontal direction on the second transform block using the inverse discrete cosine transform-VIII, the second transform block being a transform block a lower right vertex of which is at the center of the prediction block among the four transform blocks,
performs the inverse orthogonal transformation in the vertical direction on a third transform block using the inverse discrete sine transform-VII and the inverse orthogonal transformation in the horizontal direction on the third transform block using the inverse discrete cosine transform-VIII, the third transform block being a transform block an upper right vertex of which is at the center of the prediction block among the four transform blocks, and
performs the inverse orthogonal transformation in the vertical direction on a fourth transform block using the inverse discrete sine transform-VII and the inverse orthogonal transformation in the horizontal direction on the fourth transform block using the inverse discrete sine transform-VII, the fourth transform block being a transform block an upper left vertex of which is at the center of the prediction block among the four transform blocks.

17. The decoding method as claimed in claim 12, wherein the partitioning the prediction block partitions the prediction block into three pieces in the vertical direction and in the horizontal direction to generate nine transform blocks that do not overlap with each other, the decoding method comprising
performing an inverse orthogonal transformation in the vertical direction on a first transform block using an inverse discrete cosine transform-VIII and the inverse orthogonal transformation in the horizontal direction on the first transform block using the inverse discrete cosine transform-VIII, the first transform block being a transform block an upper left vertex of which is at an upper left vertex of the prediction block among the nine transform blocks,
performing the inverse orthogonal transformation in the vertical direction a and transform block using the inverse discrete cosine transform-VIII and the inverse orthogonal transformation in the horizontal direction on the second transform block using an inverse discrete cosine transform-VII, the second transform block being a transform block an upper right vertex of which is at an upper right vertex of the prediction block among the nine transform blocks,
performing the inverse orthogonal transformation in the vertical direction on a third transform block using the inverse discrete, sine transform-VII and the inverse orthogonal transformation in the horizontal direction on the third transform block using the inverse discrete cosine transform-VIII, the third transform block being a transform block a lower left vertex of which is at a lower left vertex of the prediction block among the nine transform blocks, and performing, the inverse orthogonal transformation in the vertical direction on a fourth transform block using the inverse discrete sine transform-VII and the inverse orthogonal transformation in the horizontal direction on the fourth transform block using the inverse discrete sine transform-VII, the fourth transform block being a transform block a lower right vertex of which is at a lower right vertex of the prediction block among the nine transform blocks.

18. The decoding method as claimed in claim 17, the decoding method comprising:

performing the inverse orthogonal transformation in the vertical direction on a fifth transform block using the inverse discrete cosine transform-VIII and the inverse orthogonal transformation in the horizontal direction on the fifth transform block using the inverse discrete cosine transform-II the fifth transform block being a transform block between the first transform block and the second transform block among the nine transform blocks, performing the inverse orthogonal transformation in the vertical direction on a sixth transform block using the inverse discrete cosine transform-II and the inverse orthogonal transformation in the horizontal direction on the sixth transform block using the inverse discrete sine transform-VII, the sixth transform block being a transform block between the second transform block and the fourth transform block among the nine transform blocks, performing the inverse orthogonal transformation in the vertical direction on a seventh transform block using the inverse discrete sine transform-VII and the inverse orthogonal transformation in the horizontal direction on the seventh transform block using the inverse discrete cosine transform-II, the seventh transform block being a transform block between the third transform block and the fourth transform block among the nine transform blocks, and performing the inverse orthogonal transformation in the vertical direction on an eighth transform block using the inverse discrete cosine transform-II and the inverse orthogonal transformation in the horizontal direction on the eighth transform block using the inverse discrete cosine transform-VIII, the eighth transform block being a transform block between the first transform block and the third transform block among the nine transform blocks.

19. The decoding method as claimed in claim 17, the decoding method comprising performing the inverse orthogonal transformation in the vertical direction on a ninth transform block using the inverse discrete cosine transform-II and the inverse orthogonal transformation in the horizontal direction on the ninth transform block using the inverse discrete cosine transform-II, the ninth transform block being a transform block including the center of the prediction block among the nine transform blocks.

20. The decoding method as claimed in claim 12, wherein the partitioning the prediction block partitions the prediction block into two pieces in the vertical direction and into three pieces in the horizontal direction to generate six transform blocks that do not overlap with each other, when the prediction block is horizontally long, the decoding method comprising performing an inverse orthogonal transformation in the vertical direction on a first transform block using an inverse discrete cosine transform-VIII and the inverse orthogonal transformation in the horizontal direction on the first transform block using the inverse discrete cosine transform-VIII, the first transform block being a transform block an upper left vertex of which is at an upper left vertex of the prediction block among the six transform blocks, performing the inverse orthogonal transformation in the vertical direction on a second transform block using the inverse discrete cosine transform-VIII and the inverse orthogonal transformation in the horizontal direction on the second transform block using an inverse discrete sine transform-VII, the second transform block being a transform block an upper right vertex of which is at an upper right vertex of the prediction block among the six transform blocks, performing the inverse orthogonal transformation in the vertical direction on a third transform block using the inverse discrete sine transform-VII and the inverse orthogonal transformation in the horizontal direction on the third transform block using the inverse discrete cosine transform-VIII, the third transform block being a transform block a lower left vertex of which is at a lower left vertex of the prediction block among the six transform blocks, and performing the inverse orthogonal transformation in the vertical direction on a fourth transform block using the inverse discrete sine transform-VII and the inverse orthogonal transformation in the horizontal direction on the fourth transform block using the inverse discrete sine transform-VII, the fourth transform block being a transform block a lower right vertex of which is at a lower right vertex of the prediction block among the six transform blocks.

21. The decoding method as claimed in claim 20, the decoding method comprising:

performing the inverse orthogonal transformation in the vertical direction on a fifth transform block using the inverse discrete cosine transform-VIII and the inverse orthogonal transformation in the horizontal direction on the fifth transform block using the inverse discrete cosine transform-II, the fifth transform block being a transform block between the first transform block and the second transform block among the six transform blocks, and performing the inverse orthogonal transformation in the vertical direction on a sixth transform block using the inverse discrete sine transform-VII and the inverse orthogonal transformation in the horizontal direction on the sixth transform block using the inverse discrete cosine transform-II, the sixth transform block being a transform block between the third transform block and the fourth transform block among the six transform blocks.

22. The decoding method as claimed in claim 12, wherein the partitioning the prediction block partitions the prediction block into three pieces in the vertical direction and into two pieces in the horizontal direction to generate six transform blocks that do not overlap with each other, when the prediction block is vertically long, the decoding method comprising performing an inverse orthogonal transformation in the vertical direction on a first transform block using an inverse discrete cosine transform-VIII and the inverse orthogonal transformation in the horizontal direction on the first transform block using the inverse discrete cosine transform-VIII the first transform block being a transform block an upper left vertex of which is at an upper left vertex of the prediction block among the six transform blocks, performing the inverse orthogonal transformation in the vertical direction on a second transform block using the inverse discrete cosine transform-VIII and the inverse orthogonal transformation in the horizontal direction on the second transform block using an inverse discrete sine transform-VIII, the second transform block being a transform block an upper right vertex of which is at an upper right vertex of the prediction block among the six transform blocks, performing the inverse orthogonal transformation in the vertical direction on a third transform block using the inverse discrete sine transform-VII and the inverse orthogonal transformation in the horizontal direction on the third transform block using the inverse discrete cosine transform-VIII, the third transform block being a transform block a lower left vertex of which is at a lower left vertex of the prediction block among the six transform blocks, and performing the inverse orthogonal transformation in the vertical direction on a fourth transform block using the inverse discrete sine transform-VII and the inverse orthogonal transformation in the horizontal direction on the fourth transform block using the inverse discrete sine transform-VII, the fourth transform block being a transform block a lower right vertex of which is at a lower right vertex of the prediction block among the six transform blocks.

23. The decoding method as claimed in claim 22, the decoding method comprising:

performing the inverse orthogonal transformation in the vertical direction on a fifth transform block using the inverse discrete cosine transform-II and the inverse orthogonal transformation in the horizontal direction on the fifth transform block using the inverse discrete cosine transform-VIII, the fifth transform block being a transform block between the first transform block and the third transform block among the six transform blocks, and performing the inverse orthogonal transformation in the vertical direction on a sixth transform block using the inverse discrete cosine transform-II and the inverse orthogonal transformation in the horizontal direction on the sixth transform block using the inverse discrete sine transform-VII, the sixth transform block being a transform block between the second transform block and the fourth transform block among the six transform blocks.

24. An encoding device for encoding an image using an inter-picture prediction, the encoding device comprising
  a processor coupled to a memory and configured to:
  determine a prediction block on which the inter-picture prediction is to be performed;
  partition the prediction block into a plurality of transform blocks by a partitioning method that partitions the prediction block, so that boundaries of the plurality of transform blocks are symmetrical with respect to a horizontal line passing a center of the prediction block and are symmetrical with respect to a vertical hue passing the center of the prediction block, the plurality of transform blocks being rectangular; and
  determine, for each of the plurality of transform blocks, an orthogonal transformation type used for each eta vertical direction and a horizontal direction of a given transform block of the plurality of transform blocks based on a positional relation between the given transform block and the center of the prediction block.

25. A decoding device for decoding an encoding sequence of an encoded image using an inter-picture prediction, the decoding device comprising
  a processor coupled to a memory and configured to:
  determine a prediction block on which the inter-picture prediction is to be performed;
  partition the prediction block into a plurality of transform blocks by a partitioning method that partitions the prediction block, so that boundaries of the plurality of transform blocks are symmetrical with respect to a horizontal line passing a center of the prediction block and are symmetrical with respect to a vertical line passing the center of the prediction block, the plurality of transform blocks being rectangular; and
  determine, for each of the plurality of transform blocks, an inverse orthogonal transformation type used for each of a vertical direction and a horizontal direction of a given transform block of the plurality of transform blocks based on a positional relation between the given transform block and the center of the prediction block.

26. A non-transitory computer-readable storage medium having stored therein an encoding program for causing a computer to execute a process to encode an image using an inter-picture prediction, process comprising:
  determining a prediction block on which the inter-picture prediction is to be performed;
  partitioning the prediction block into a plurality of transform blocks by a partitioning method that partitions the prediction block, so that boundaries of the plurality of transform blocks are symmetrical with respect to a horizontal line passing a center of the prediction block and are symmetrical with respect to a vertical line passing the center of the prediction block, the plurality of transform blocks being rectangular; and
  determining, for each of the plurality of transform blocks, an orthogonal transformation type used for each of a vertical direction and a horizontal direction of a given transform block of the plurality of transform blocks based on a positional relation between the given transform block and the center of the prediction block.

27. A non-transitory computer-readable storage medium having stored therein a decoding program for causing a computer to execute a process to decode an encoding sequence of an encoded image using an inter-picture prediction, the process comprising:
  determining a prediction block on which the inter-picture prediction is to be performed;
  partitioning the prediction block into a plurality of transform blocks b a partitioning method that partitions the prediction block, so that boundaries of the plurality of transform blocks are symmetrical with respect to a horizontal line passing a center of the prediction block and are symmetrical with respect to a vertical line passing the center of the prediction block, the plurality of transform blocks being rectangular; and
  determining, for each of the plurality of transform blocks, an inverse orthogonal transformation type used for each of a vertical direction and a horizontal direction of a given transform block of the plurality of transform blocks based on a positional relation between the given transform block and the center of the prediction block.

* * * * *